United States Patent
Takács et al.

(10) Patent No.: US 11,445,510 B2
(45) Date of Patent: Sep. 13, 2022

(54) OPTIMIZATION OF RADIO RESOURCE ALLOCATION BASED ON UNMANNED AERIAL VEHICLE FLIGHT PATH INFORMATION

(71) Applicant: Telefonaktiebolaget LM Ericsson (publ), Stockholm (SE)

(72) Inventors: Attila Takács, San Jose, CA (US); Ravi Manghirmalani, Fremont, CA (US); Heikki Mahkonen, San Jose, CA (US); Yi-Pin Eric Wang, Fremont, CA (US); Xingqin Lin, San Jose, CA (US)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 16/629,928

(22) PCT Filed: Jul. 10, 2017

(86) PCT No.: PCT/IB2017/054160
§ 371 (c)(1),
(2) Date: Jan. 9, 2020

(87) PCT Pub. No.: WO2019/012308
PCT Pub. Date: Jan. 17, 2019

(65) Prior Publication Data
US 2020/0154426 A1 May 14, 2020

(51) Int. Cl.
*H04W 72/04* (2009.01)
*H04W 4/40* (2018.01)
(Continued)

(52) U.S. Cl.
CPC ......... *H04W 72/048* (2013.01); *B64C 39/024* (2013.01); *G08G 5/003* (2013.01);
(Continued)

(58) Field of Classification Search
CPC ..... G08G 5/003; G08G 5/0013; H04W 28/26; H04W 88/085; B64C 39/024; B64C 2201/126
See application file for complete search history.

(56) References Cited

U.S. PATENT DOCUMENTS

| | | | |
|---|---|---|---|
| 7,813,326 B1 | 10/2010 | Kelm et al. | |
| 9,363,690 B1 | 6/2016 | Singh et al. | |

(Continued)

FOREIGN PATENT DOCUMENTS

| | | |
|---|---|---|
| CN | 101836478 A | 9/2010 |
| CN | 104053195 A | 9/2014 |

(Continued)

OTHER PUBLICATIONS

Office Action, TW App No. 107115169, dated Apr. 22, 2019, 9 pages (2 pages of Partial English Translation and 7 pages of Original Document).

(Continued)

*Primary Examiner* — Jinsong Hu
*Assistant Examiner* — Farideh Madani
(74) *Attorney, Agent, or Firm* — Nicholson De Vos Webster & Elliott LLP

(57) ABSTRACT

A method for managing a wireless connection of an Unmanned Aerial Vehicle (UAV) is described herein. In one embodiment, the method comprises receiving flight information describing a flight path for the UAV; determining a set of network resources for the UAV based on the flight information; and reserving the set of network resources by a first network cell and a second network cell of a wireless network based on the flight information.

14 Claims, 12 Drawing Sheets

(51) Int. Cl.
*B64C 39/02* (2006.01)
*G08G 5/00* (2006.01)
*H04W 28/26* (2009.01)

(52) U.S. Cl.
CPC ............ *G08G 5/0013* (2013.01); *H04W 4/40* (2018.02); *H04W 28/26* (2013.01); *B64C 2201/126* (2013.01)

(56) References Cited

U.S. PATENT DOCUMENTS

| | | | |
|---|---|---|---|
| 9,412,278 | B1 | 8/2016 | Gong et al. |
| 9,434,267 | B2 | 9/2016 | Wang et al. |
| 9,467,922 | B1 | 10/2016 | Buchmueller et al. |
| 9,537,561 | B1 | 1/2017 | Kotecha et al. |
| 9,576,493 | B2 | 2/2017 | Jarrell |
| 9,588,516 | B1 | 3/2017 | Gurel et al. |
| 9,609,288 | B1 | 3/2017 | Richman et al. |
| 9,709,409 | B2 | 7/2017 | Dave et al. |
| 9,714,012 | B1 | 7/2017 | Hoareau et al. |
| 9,764,703 | B2 | 9/2017 | Hoareau et al. |
| 9,815,633 | B1 | 11/2017 | Kisser et al. |
| 9,882,640 | B1 | 1/2018 | Chaudhuri et al. |
| 9,950,814 | B1 | 4/2018 | Beckman et al. |
| 10,023,309 | B2 | 7/2018 | Brown |
| 10,142,019 | B2 | 11/2018 | Chaudhuri et al. |
| 10,153,837 | B2 | 12/2018 | Chaudhuri et al. |
| 10,195,952 | B2 | 2/2019 | Wang et al. |
| 10,332,405 | B2 | 6/2019 | Kopardekar |
| 10,363,826 | B2 | 7/2019 | Wang |
| 10,373,487 | B2 | 8/2019 | Kim et al. |
| 10,384,692 | B2 | 8/2019 | Beckman et al. |
| 10,421,542 | B2 | 9/2019 | Beckman et al. |
| 10,453,348 | B2 | 10/2019 | Speasl et al. |
| 10,467,685 | B1 | 11/2019 | Brisson et al. |
| 10,493,863 | B1 | 12/2019 | Run et al. |
| 10,532,815 | B1 | 1/2020 | Thrun et al. |
| 10,614,515 | B1 | 4/2020 | Brisson et al. |
| 10,661,896 | B2 | 5/2020 | Ozaki |
| 10,703,480 | B1 | 7/2020 | Thrun et al. |
| 10,899,473 | B1 | 1/2021 | Scherz |
| 10,953,754 | B1 | 3/2021 | Wiegman |
| 10,974,911 | B2 | 4/2021 | Zevenbergen et al. |
| 11,044,192 | B2 | 6/2021 | Kim et al. |
| 2004/0156399 | A1 | 8/2004 | Eran |
| 2007/0284474 | A1 | 12/2007 | Olson et al. |
| 2010/0062774 | A1 | 3/2010 | Motegi et al. |
| 2010/0085236 | A1 | 4/2010 | Franceschini et al. |
| 2010/0153001 | A1 | 6/2010 | Bauchot et al. |
| 2010/0254346 | A1* | 10/2010 | Jain ...................... H04W 36/32 370/331 |
| 2012/0225675 | A1 | 9/2012 | Nishida et al. |
| 2014/0032034 | A1 | 1/2014 | Raptopoulos et al. |
| 2015/0038140 | A1 | 2/2015 | Kilpatrick et al. |
| 2015/0119043 | A1 | 4/2015 | Gopal et al. |
| 2015/0142211 | A1 | 5/2015 | Shehata et al. |
| 2015/0208300 | A1 | 7/2015 | McLaughlin et al. |
| 2015/0312813 | A1 | 10/2015 | Xu et al. |
| 2016/0065345 | A1* | 3/2016 | Kim .................. H04W 72/0406 370/330 |
| 2016/0070265 | A1 | 3/2016 | Liu et al. |
| 2016/0125740 | A1 | 5/2016 | Pasko et al. |
| 2016/0140851 | A1 | 5/2016 | Levy et al. |
| 2016/0142211 | A1 | 5/2016 | Metke et al. |
| 2016/0142944 | A1 | 5/2016 | Cao |
| 2016/0142994 | A1* | 5/2016 | Luo .................. H04W 56/0015 370/328 |
| 2016/0161258 | A1 | 6/2016 | Magson et al. |
| 2016/0200421 | A1 | 7/2016 | Morrison |
| 2016/0266579 | A1 | 9/2016 | Chen et al. |
| 2016/0270062 | A1 | 9/2016 | Dinan |
| 2016/0284221 | A1 | 9/2016 | Hinkle et al. |
| 2016/0292403 | A1 | 10/2016 | Gong et al. |
| 2016/0300493 | A1 | 10/2016 | Ubhi et al. |
| 2016/0300495 | A1 | 10/2016 | Kantor et al. |
| 2016/0358187 | A1 | 12/2016 | Radocchia et al. |
| 2016/0363929 | A1 | 12/2016 | Clark et al. |
| 2016/0371985 | A1 | 12/2016 | Kotecha |
| 2016/0371987 | A1 | 12/2016 | Kotecha |
| 2016/0380692 | A1 | 12/2016 | Jalali et al. |
| 2017/0023939 | A1 | 1/2017 | Leonard et al. |
| 2017/0045884 | A1 | 2/2017 | Kablaoui |
| 2017/0063445 | A1* | 3/2017 | Feria .................. H04B 7/18504 |
| 2017/0069214 | A1 | 3/2017 | Dupray et al. |
| 2017/0092137 | A1 | 3/2017 | Hiebl |
| 2017/0124884 | A1 | 5/2017 | Shaw et al. |
| 2017/0142766 | A1 | 5/2017 | Kim |
| 2017/0150373 | A1 | 5/2017 | Brennan et al. |
| 2017/0168480 | A1 | 6/2017 | Wanstedt et al. |
| 2017/0245160 | A1* | 8/2017 | Rost .................. H04L 5/14 |
| 2017/0295458 | A1 | 10/2017 | Gao et al. |
| 2017/0323572 | A1 | 11/2017 | Chan et al. |
| 2017/0374572 | A1 | 12/2017 | Kleinbeck et al. |
| 2018/0086456 | A1 | 3/2018 | Burch et al. |
| 2018/0086483 | A1 | 3/2018 | Priest et al. |
| 2018/0152510 | A1 | 5/2018 | Newton et al. |
| 2018/0206083 | A1 | 7/2018 | Kumar et al. |
| 2018/0247544 | A1* | 8/2018 | Mustafic .............. G08G 5/0039 |
| 2018/0279348 | A1* | 9/2018 | Huang .................. H04W 76/27 |
| 2018/0375568 | A1* | 12/2018 | De Rosa .............. G08G 5/0039 |
| 2019/0012923 | A1* | 1/2019 | Weisbrod ............ G08G 5/0069 |
| 2019/0087576 | A1 | 3/2019 | Olson |
| 2019/0149417 | A1 | 5/2019 | Augusto et al. |
| 2019/0289505 | A1 | 9/2019 | Thomas et al. |
| 2019/0329877 | A1 | 10/2019 | Benson et al. |
| 2019/0364492 | A1 | 11/2019 | Azizi et al. |
| 2020/0005651 | A1 | 1/2020 | Priest |
| 2020/0105149 | A1 | 4/2020 | Mahkonen et al. |
| 2020/0193844 | A1 | 6/2020 | Mahkonen et al. |
| 2020/0301445 | A1 | 9/2020 | Jourdan et al. |
| 2021/0281307 | A1* | 9/2021 | Liang .................. H04B 7/024 |

FOREIGN PATENT DOCUMENTS

| | | |
|---|---|---|
| CN | 105828345 A | 8/2016 |
| EP | 2175290 A1 | 4/2010 |
| EP | 2175290 B1 | 10/2013 |
| EP | 3029996 A1 | 6/2016 |
| EP | 3139516 A1 | 3/2017 |
| EP | 3349085 A1 | 7/2018 |
| JP | 2003-092545 A | 3/2003 |
| RU | 2595642 C1 | 8/2016 |
| RU | 2637838 C2 | 12/2017 |
| WO | 2011/100535 A1 | 8/2011 |
| WO | 2012/112097 A1 | 8/2012 |
| WO | 2015/114572 A1 | 8/2015 |
| WO | 2015/179439 A1 | 11/2015 |
| WO | 2016/154949 A1 | 10/2016 |
| WO | 2016/161637 A1 | 10/2016 |
| WO | 2016/164892 A1 | 10/2016 |
| WO | 2016/190793 A1 | 12/2016 |
| WO | 2017/042403 A1 | 3/2017 |
| WO | 2017/048363 A1 | 3/2017 |
| WO | 2017/149160 A1 | 9/2017 |

OTHER PUBLICATIONS

Office Action, TW App. No. 107115169, dated Nov. 28, 2018, 17 pages (8 pages of English Translation and 9 pages of Original Document).
3GPP TS 23.203 V12.6.0, 3rd Generation Partnership Project, Technical Specification Group Services and System Aspects, Policy and charging control architecture, (Release 12), Sep. 2014, 220 pages.
3GPP TS 23.203 V14.2.0, 3rd Generation Partnership Project, Technical Specification Group Services and System Aspects, Policy and charging control architecture, (Release 14), Dec. 2016, 256 pages.
3GPP TS 23.271 V14.0.0, 3rd Generation Partnership Project, Technical Specification Group Services and System Aspects, Functional stage 2 description of Location Services (LCS), (Release 14), Dec. 2016, 180 pages.

(56) References Cited

OTHER PUBLICATIONS

3GPP TS 23.401 V14.2.0, 3rd Generation Partnership Project, Technical Specification Group Services and System Aspects, General Packet Radio Service (GPRS) enhancements for Evolved Universal Terrestrial Radio Access Network (E-UTRAN) access, (Release 14), Dec. 2016, 385 pages.
3GPP TS 36.201 V14.0.0, 3rd Generation Partnership Project, Technical Specification Group Radio Access Network, Evolved Universal Terrestrial Radio Access (E-UTRA) LTE physical layer; General description, (Release 14), Sep. 2016, 15 pages.
3GPP TS 36.300 V14.1.0, 3rd Generation Partnership Project, Technical Specification Group Radio Access Network, Evolved Universal Terrestrial Radio Access (E-UTRA) and Evolved Universal Terrestrial Radio Access Network (E-UTRAN), Overall description, Stage 2, (Release 14), Dec. 2016, 317 pages.
3GPP TS 45.002 V14.0.0, 3rd Generation Partnership Project, Technical Specification Group Radio Access Network, GSM/EDGE Multiplexing and multiple access on the radio path, (Release 14), Dec. 2016, 142 pages.
Curran et al., "Location Based Predictive Handoff Algorithm for Mobile Networks," Advances in Intelligent IT: Active Media Technology, May 2006, pp. 86-91.
Federal Aviation Administration, Automatic Dependent Surveillance-Broadcast (ADS-B), 2019, 2 pages.
Forsberg, Providing Air Traffic Control Services for Small Unmanned Aircraft Through LTE, https://www.diva-portal.org/smash/get/diva2:1041494/FULLTEXT01.pdf, 2016, 90 pages.
GPS World, "uAvionix demonstrates dime-sized ADS-B for high-traffic drone operations", available online at <http://gpsworld.com/uavionix-demonstrates-dime-sized-ads-b-for-high-traffic-drone-operations>, retrieved on Apr. 4, 2017, 6 pages.
Guterres et al., "ADS-B Surveillance System Performance with Small UAS at Low Altitudes", available online at <https://www.mitreorg/sites/default/files/publications/16-4497-AIAA-2017-ADS-B.pdf>, 2017, 15 pages.
IEEE Std 802.11 (Trademark)—2012, Part 11: Wireless LAN Medium Access Control (MAC) and Physical Layer (PHY) Specifications, Mar. 2012, 2793 pages.
International Preliminary Report on Patentability, PCT App. No. PCT/IB2017/053444, dated Oct. 10, 2019, 9 pages.
International Preliminary Report on Patentability, PCT App. No. PCT/IB2017/053477, dated Oct. 10, 2019, 8 pages.
International Preliminary Report on Patentability, PCT App. No. PCT/IB2017/053641, dated Oct. 10, 2019, 8 pages.
International Preliminary Report on Patentability, PCT App. No. PCT/IB2017/054160, dated Oct. 16, 2019, 21 pages.
International Preliminary Report on Patentability, PCT App. No. PCT/IB2017/054252, dated Oct. 24, 2019, 8 pages.
International Preliminary Report on Patentability, PCT App. No. PCT/IB2017/057810, dated May 9, 2019, 13 pages.
International Preliminary Report on Patentability, PCT App. No. PCT/IB2017/057859, dated Oct. 10, 2019, 15 pages.
International Preliminary Report on Patentability, PCT App. No. PCT/IB2017/057860, dated Oct. 10, 2019, 14 pages.
International Search Report and Written Opinion for Application No. PCT/IB2017/053477, dated Dec. 15, 2017, 11 pages.
International Search Report and Written Opinion for Application No. PCT/IB2017/053641, dated Nov. 22, 2017, 11 pages.
International Search Report and Written Opinion for Application No. PCT/IB2017/054252, dated Jan. 3, 2018, 11 pages.
International Search Report and Written Opinion for Application No. PCT/IB2017/057810, dated Mar. 13, 2018, 10 pages.
International Search Report and Written Opinion for Application No. PCT/IB2017/057859, dated Jun. 12, 2018, 21 pages.
International Search Report and Written Opinion for Application No. PCT/IB2017/057860, dated Jun. 12, 2018, 20 pages.
International Search Report and Written Opinion, PCT App. No. PCT/IB2017/053444, dated Dec. 21, 2017, 13 pages.
International Search Report and Written Opinion, PCT App. No. PCT/IB2017/058525, dated Jul. 30, 2018, 14 pages.
International Search Report and Written Opinion, PCT App. No. PCT/IB2018/052238, dated Dec. 13, 2018, 12 pages.
International Search Report and Written Opinion, PCT App. No. PCT/IB2018/052239, dated Nov. 29, 2018, 13 pages.
International Search Report and Written Opinion, PCT App. No. PCT/US2017/050046, dated Dec. 13, 2017, 13 pages.
Kapellaki et al., "The "Le" interface: performance evaluation of 2-tier and 3-tier 3GPP compliant realizations," IEEE International Conference on Communications, ICC 2005, vol. 3, No. 16, 2005, pp. 1423-1427.
Latas, "The Drone Safety Platform", available online at <http://www.flylatas.com/>, retrieved on Mar. 31, 2017, 7 pages.
MAVLINK Common Message set specifications, available online at <http://mavlink.org/messages/common>, retrieved on Jan. 31, 2017, 98 pages.
Opensignal, "Opensignal combines real-world measurements with scientific analysis to provide independent insights on mobile connectivity globally", available online at <https://www.opensignal.com/>, 2020, 4 pages.
Orefice, "ADS-B Based Sense and Avoid Applications for General Aviation/Unmanned Aircraft", available online at <http://www.fedoa.unina.it/10305/1/orefice_martina_27.pdf>, 2015, 114 pages.
Qualcomm, LTE Unmanned Aircraft Systems, Qualcomm Technologies, Inc., Trial Report, v1.0.1, May 12, 2017, 65 pages.
R1-1705823, 3GPP TSG-RAN WG1 Meeting 88bis, Spokane, KDDI Corporation, Field measurement results for drone LTE enhancement, USA, Apr. 3-7, 2017, 6 pages.
Radio Control, Beginners' Guide, available online at <https://rcplanes.online/guide1.htm>, May 8, 2019, 9 pages.
Ruano et al., "Augmented Reality Tool for the Situational Awareness Improvement of UAV Operators", Sensors, vol. 17, 2017, 16 pages.
SUR.ET1.ST05.2000-STD-12-01, Eurocontrol Standard Document for Surveillance Data Exchange, Part 12: Category 021, ADS-B Reports, Dec. 2010, 72 pages.
UAS Identification and Tracking (UAS ID) Aviation Rulemaking Committee (ARC), ARC Recommendations Final Report, Sep. 30, 2017, 213 pages.
UAvionix, "ADS-B Transceivers, Receivers and Navigation Systems for Drones", available online at <http://www.unmannedsystemstechnology.com/company/uavionix-corporation>, retrieved on Apr. 4, 2017, 10 pages.
Unmanned Aircraft System (UAS) Traffic Management (UTM), available online at <https://utm.arc.nasa.gov/index.shtml>, retrieved on Apr. 4, 2017, 2 pages.
Wikipedia, "Blockchain", available online at <https://en.wikipedia.org/w/index.php?title=Blockchain&oldid=901056350>, retrieved on Jun. 9, 2019, 20 pages.
Wikipedia, "Global Positioning System", available online at <https://en.wikipedia.org/w/index.php?title=Global_Positioning_System&oldid=917890871>, Sep. 26, 2019, 36 pages.
International Search Report and Written Opinion for Application No. PCT/IB2017/054160, dated Mar. 13, 2018, 16 pages.
Second Written Opinion for Application No. PCT/IB2017/054160, dated Jun. 7, 2019, 15 pages.
Huawei et al., "Mobility enhancement for Drones", 3GPP TSG-RAN WG2 Meeting #98, R2-1704997, 3rd Generation Partnership Project (3GPP), Hangzhou, China, May 14, 2017 (May 14, 2017), XP051275500, Retrieved from the Internet: URL:http://www.3gpp.org/ftp/Meetings_3GPP _SYNC/RAN2/Docs/.
Huawei et al., "Potential enhancements for drones", 3GPP TSG-RAN WG1 Meeting #89, R1-1707016, 3rd Generation Partnership Project (3GPP), Hangzhou, China, May 14, 2017 (May 14, 2017), XP051272246, Retrieved from the Internet: URL:http://www.3gpp.org/ftp/Meetings_3GPP_SYNC/RAN1/Docs/.
LG Electronics Inc., "Aerial Traffic Handling using Positioning Identification", 3GPP TSG-RAN WG2 Meeting #98, R2-1705660, 3rd Generation Partnership Project (3GPP), Hangzhou, China, May 14, 2017 (May 14, 2017), XP051275974, Retrieved from the Internet: URL:http://www.3gpp.org/ftp/Meetings_3GPP _SYNC/RAN2/Docs/.

\* cited by examiner

OPTIMIZATION OF RADIO RESOURCE ALLOCATION BASED ON UNMANNED AERIAL VEHICLE FLIGHT PATH INFORMATION

CROSS-REFERENCE TO RELATED APPLICATIONS

This application is a National stage of International Application No. PCT/IB2017/054160, filed Jul. 10, 2017, which is hereby incorporated by reference.

FIELD

Embodiments of the invention relate to the field of managing Unmanned Aerial Vehicles (UAVs); and more specifically, to managing resources allocated/assigned to a UAV based on a flight path of the UAV.

BACKGROUND

The Federal Aviation Administration (FAA) and National Aeronautics and Space Administration (NASA) are defining an Unmanned Aerial Vehicle (UAV) Traffic Management (UTM) framework/system. Such a system seeks to present an effective management structure for UAV traffic. In this vein, the UTM is sought to act as an enabler to promote widespread use of UAVs in both commercial and recreational settings while at the same time minimizing the perils to manned air traffic and surrounding pieces of infrastructure. The UTM system is designed to work autonomously, with no active human air traffic controller constantly supervising and monitoring the airspace.

Besides enforcing constraints and directives from the FAA and other regulatory/governmental agencies, the UTM can provide supplemental data services to UAV operators. Such services could include terrain information, weather information, communication coverage, spatial occupancy of other UAVs, surveillance information of a mission area, or performance information of specific aircraft. The UTM also allows private and public entities to provide constraints, notifications and other necessary information to carry out UAV missions in a safe manner. A UAV Service Supplier (USS) in the UTM architecture is the entity that collects all required information from other entities or connects information consumers with their providers upon request.

A UTM system may be used for the planning, scheduling and execution of a UAV mission. When a UAV operator is planning for a UAV mission (e.g., a package delivery mission), the UAV operator will post the planned mission request to the USS. The USS will check that the planned mission is allowed by a Flight Information Management System (FIMS) and if permitted and with no scheduling conflicts, the UAV operator will eventually be granted a "go ahead" to carry out the mission. At this stage, the USS could send all relevant information, including the flight path, to the UAV operator. Once the mission is in progress, the USS can issue fresh notifications to the UAV operator if any mission conditions change during the allocated time slot of the mission (e.g., fresh new constraints are issued, weather emergencies arise or the airspace becomes congested).

Several different technologies/protocols have been used for providing UAV connectivity. Increasingly, cellular networks are being considered for UAVs. Cellular networks offer close-to-ubiquitous wide-area coverage, reliability, and security. However, cellular networks provide some issues for UAVs.

In today's cellular networks, all cells share the same pool of radio resources. A radio resource is a frequency allocation over a period time. For example, in a 3rd Generation Partnership Project (3GPP) Long-Term Evolution (LTE) network, a basic radio resource unit is referred to as physical resource block (PRB) pair (e.g., 180 kHz over 1 millisecond). LTE cells may use one-to-one frequency reuse, such that a PRB used by a first piece of user equipment in cell A may be allocated to a second piece of user equipment in cell B. However, this one-to-one frequency reuse may be problematic when one piece of user equipment is a UAV. In particular, while operating at a high altitude (relative to the operating altitude of a typical piece of user equipment), a signal emitted by a UAV may be radiated without obstruction such that the signal can be picked up by many cells and other pieces of user equipment, including those far from the UAV. The signal radiated from a UAV therefore can cause interference for many cells and pieces of user equipment using the same radio/network resource. Such interference degrades the quality of service for other pieces of user equipment in the wireless network. Similarly, due to high altitude, the UAV may experience interference from many cells, whose signals are similarly permitted to radiate without obstruction. This interference limits the reliability and reception quality at the UAV.

SUMMARY

A method for managing a wireless connection of an Unmanned Aerial Vehicle (UAV) is described herein. In one embodiment, the method comprises receiving flight information describing a flight path for the UAV; determining a set of network resources for the UAV based on the flight information; and reserving the set of network resources by a first network cell and a second network cell of a wireless network based on the flight information.

As described herein, a wireless network may reduce or eliminates interference experienced by or caused by a UAV by reserving network resources for the UAV in multiple network cells. In particular, the techniques described herein ensure that signals that are allowed to propagate unobstructed from or to the UAV based on the high operating altitude of the UAV do not cause interference in the wireless network. By reducing interference, quality-of-service in the wireless network is increased and potential safety issues with command and control links are mitigated.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
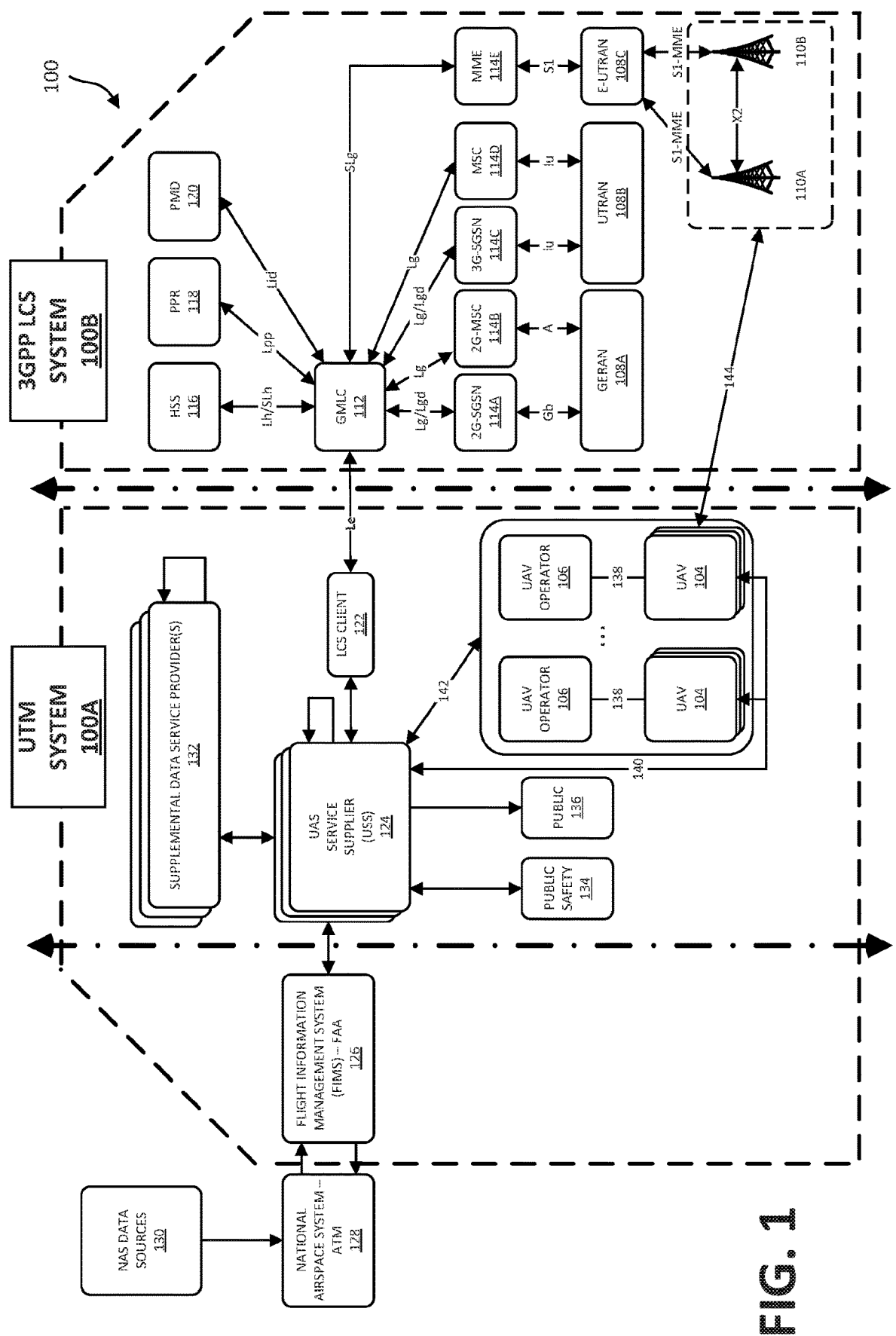
FIG. 1 illustrates an air traffic system, including an Unmanned Aerial Vehicle (UAV) Traffic Management (UTM) system and a 3GPP Location Services (LCS) system, according to one embodiment.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

Bracketed text and blocks with dashed borders (e.g., large dashes, small dashes, dot-dash, and dots) are used herein to illustrate optional operations that add additional features to embodiments of the invention. However, such notation should not be taken to mean that these are the only options or optional operations, and/or that blocks with solid borders are not optional in certain embodiments of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist the code even when the electronic device is turned off, and while the electronic device is turned on that part of the code that is to be executed by the processor(s) of that electronic device is copied from the slower non-volatile memory into volatile memory (e.g., dynamic random-access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

A system according to one embodiment is presented herein that utilizes flight plan information to dynamically adjust radio resources reserved in certain cells in a wireless network for Unmanned Aerial Vehicle (UAV) communications. In particular, in some embodiments, the same or overlapping radio resources may be reserved in multiple cells in the wireless network on behalf of a UAV. Although the UAV may only be attached/associated with a single cell at a time, as will be described in greater detail below, reservation of the same resources in other cells prevents interference to cells in the wireless network, other pieces of user equipment operating in the wireless network, and interference to the UAV.

Turning now to FIG. 1, an air traffic system 100 will be described for managing a flight of a UAV 104, according to one embodiment. The air traffic system 100 may be used for managing the flights of one or more UAVs 104 that are controlled/operated/piloted by corresponding UAV operators 106. The UAVs 104 may be interchangeably referred to as Unmanned Aircraft Systems (UASs) or drones throughout this description. The air traffic system 100 may be divided into two logical portions: an UAV Traffic Management (UTM) system 100A and a 3GPP Location Services (LCS) system 100B. In this configuration, the UTM system 100A provides flight path information to the 3GPP LCS system 100B and the 3GPP LCS system 100B provides location services to the UTM system 100A.

The 3GPP LCS system 100B provides location information of the UAVs 104 based on wireless communications of the UAVs 104 in the wireless network 108. For instance, the 3GPP LCS system 100B may determine the location information of a particular UAV 104 based on radio signal measurements of the UAV 104 and estimating the location of the UAV 104 based on those radio signal measurements (e.g., triangulation of the radio signal measurements). Thus, the 3GPP LCS system 100B provides network determined location information of the UAVs 104, as opposed to location information being reported by the UAVs 104 themselves.

Although described in relation to location services provided by a 3GPP protocol, the systems described herein should not be construed as limited to 3GPP protocols or cellular networks. In other embodiments, location services may be provided by other cellular and wireless network providers that offer access to geographical location information of the UAV 104 based on wireless communications of the UAV 104 in networks operated by the network providers. In one embodiment, the location services may be provided by a wireless local area network. In still other embodiments, location information of the UAVs 104 may be provided through other systems, including through use of the Global Positioning System (GPS) or a similar satellite based system.

In some embodiments, the UAVs 104 may be small or miniature UAVs, which are unmanned aircraft that are small enough to be considered portable by an average man and typically operate/cruise at altitudes lower than larger aircraft. For example, a small UAV may be any unmanned aircraft that is fifty-five pounds or lighter and/or is designed to operate below 400 feet. Although the embodiments described herein may be applied to small UAVs, the systems and methods are not restricted to aircraft of these sizes or that are designed to operate at particular altitudes. Instead, the methods and systems described herein may be similarly applied to aircraft of any size or design and with or without an onboard pilot/operator. For example, in some embodiments, the methods and systems described herein may be used for UAVs 104 larger than fifty-five pounds and/or UAVs 104 that are designed to fly above 400 feet.

The UAVs 104 are aircraft without an onboard human controller. Instead, the UAVs 104 may be operated/piloted using various degrees of autonomy. For example, a UAV 104 may be operated by a human (e.g., the UAV operator 106) located on the ground or otherwise removed and independent of the location of the UAV 104. For example, a UAV operator 106 may be located on the ground and acts to directly control each movement of a UAV 104 or a group of UAVs 104 through a radio control interface (e.g., a command and control (C2) interface). In this embodiment, the UAV operator 106 may transmit commands via the radio interface to cause the UAV 104 to adjust/move particular flight instruments (e.g., flaps, blades, motors, etc.) for the purpose of following a flight plan or another set of objectives. In other scenarios, the UAV operator 106 may provide a flight plan to the UAV 104. In response to the flight plan, the UAV 104 may adjust/move particular flight instruments to fulfill objectives of the flight plan. In these embodiments, a human operator may monitor the progress of the flight plan and intervene as needed or as directed. In some embodiments, the UAV operator 106 may be viewed as the remote human controller, a remote digital controller, an onboard digital controller, or a combination of the preceding.

A flight plan may include one or more points of a path (e.g., a starting point, an ending point, and/or a set of waypoints, where each are defined by longitudinal and latitudinal coordinates), a set of velocities, a set of altitudes, a set of headings/directions, a set of events (e.g., capture video at prescribed times or locations, hover over an area for a specified interval, etc.), a time/expiration/duration, and a set of restricted zones/areas. For instance, the flight plan 200 shown in FIG. 2 indicates that the UAV 104 is to take off from location A1 (corresponding to a first set of longitude and latitude coordinates) and travel to location A2 (corresponding to a second set of longitude and latitude coordinates) using the path B. The path B may be separated into the segments B1 and B2. In this scenario, the UAV 104 is restricted to an altitude between 300 feet and 400 feet and a velocity of 100 miles/hour during segment B1 and an altitude between 350 feet and 400 feet and a velocity of 90 miles/hour during segment B2. The above altitude and velocity limitations are merely exemplary and in other embodiments higher altitude and velocity limitations may be assigned/issued for a UAV 104 (e.g., altitude limitations above 400 feet and velocity limitations above 100 miles/hour).

Figure 3:
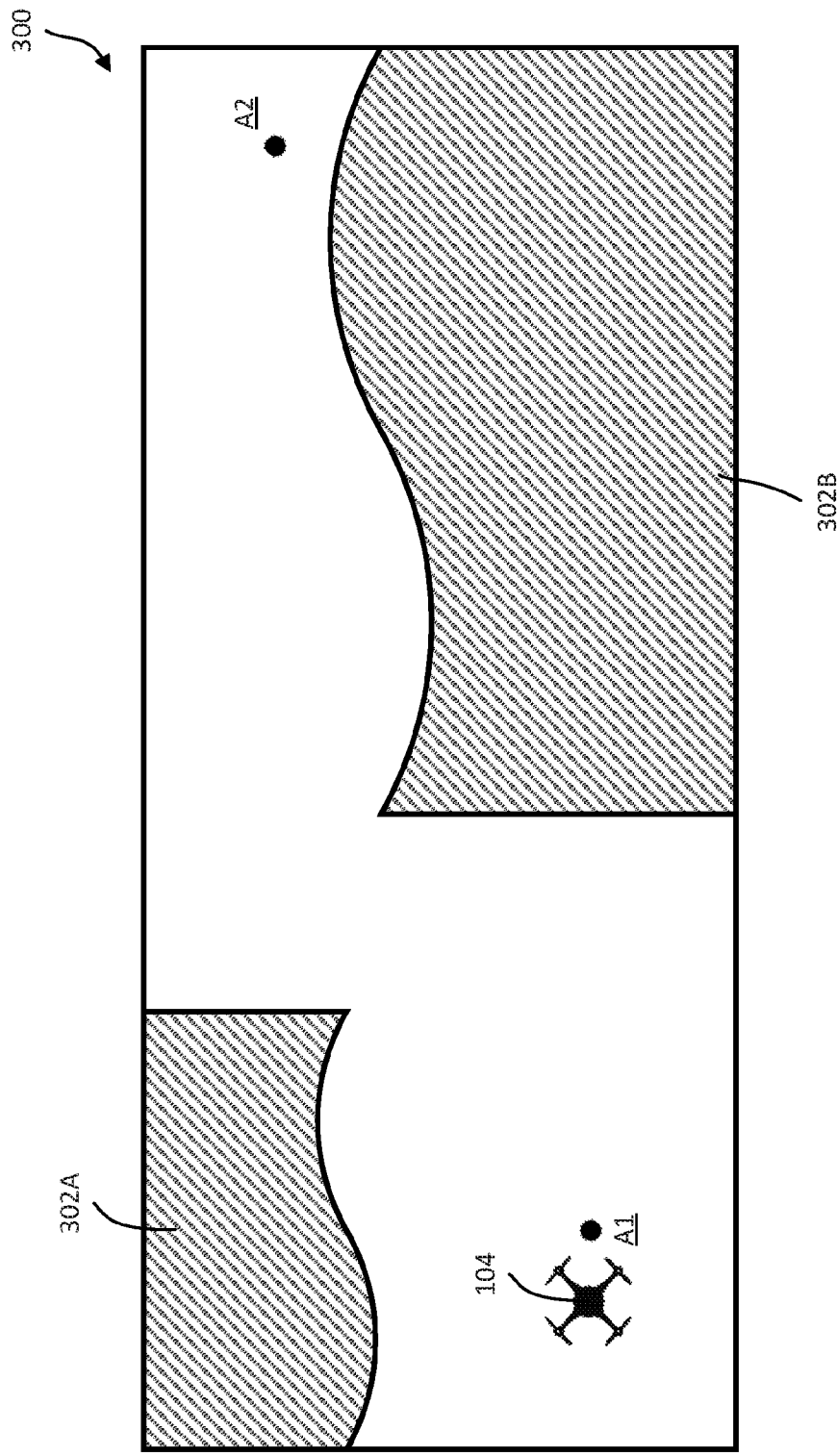
FIG. 3 illustrates an example flight plan with a set of restricted areas/zones according to one embodiment.

In another example, as shown in FIG. 3, a flight plan 300 may indicate that the UAV 104 is to take off from location A1, travel to location A2, and avoid a set of restricted zones 302A and 302B. In this example, the UAV 104 is directed to reach the target location A2 without entering the set of restricted zones 302A and 302B. The restricted zones may be relative to geographical location (defined by a set of coordinates), an altitude, and/or a velocity. For example, the UAV 104 may be permitted to enter restricted zone 302A but only at a prescribed altitude and/or only at a prescribed velocity.

Figure 4:
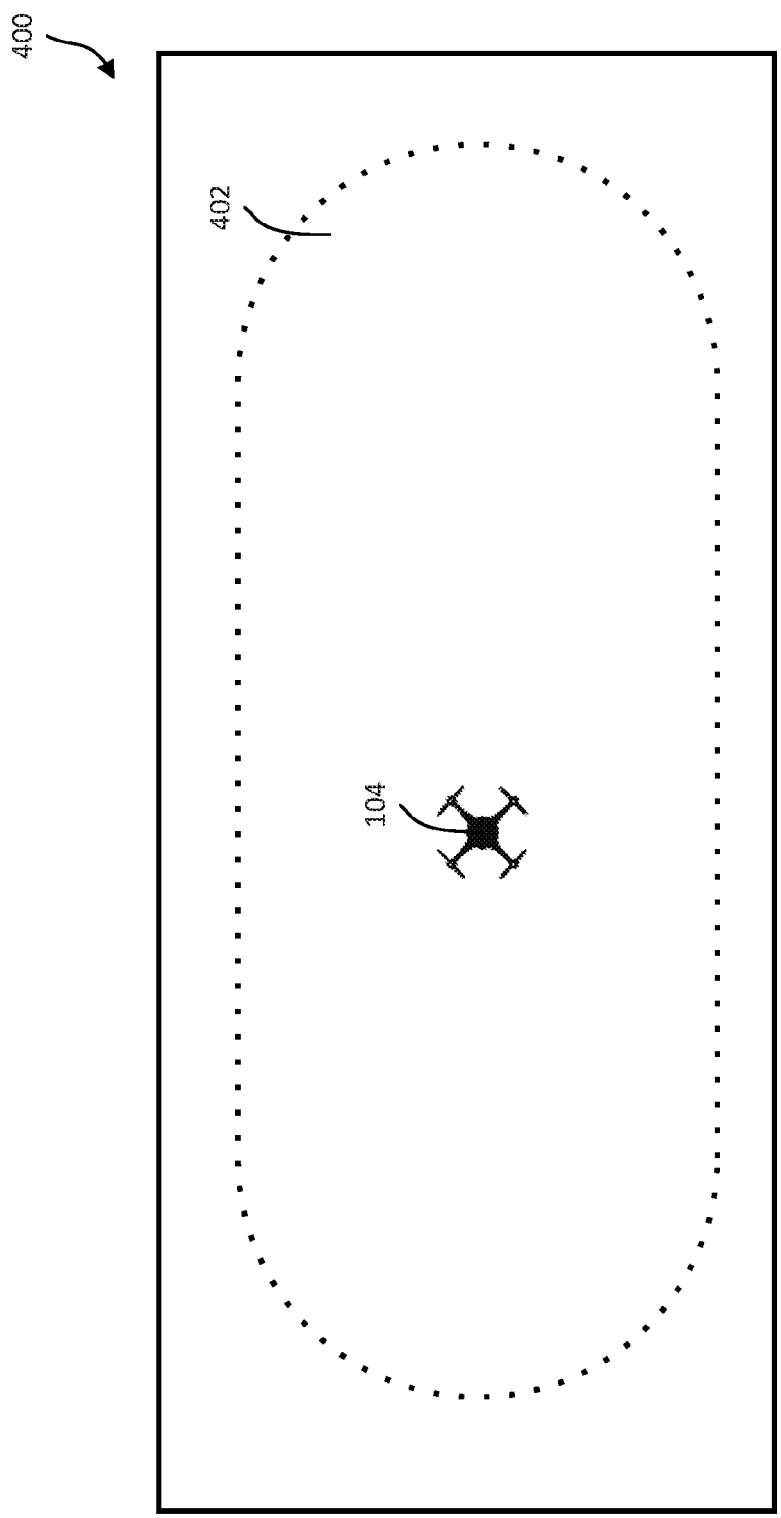
FIG. 4 illustrates an example flight plan with a designated clearance zone according to one embodiment.

In still another example, shown in FIG. 4, a flight plan 400 may provide clearance for the UAV 104 to fly in a designated clearance zone 402. The clearance zone 402 may be a confined area associated with an altitude range (e.g., between 400-500 feet) and/or an expiration/duration (e.g., an expiration of 11:40 PM). In this example, the UAV 104 may fly anywhere in the designated clearance zone 402 until the clearance has expired.

Although the flight plans described above are provided in relation to diagrams, flight plans may be encoded/presented using any format. For example, a flight plan may be represented and passed to the UAV 104 using an extensible markup language (XML) based format or another encoding or representation that is decodable and parseable by a machine.

Figure 5:
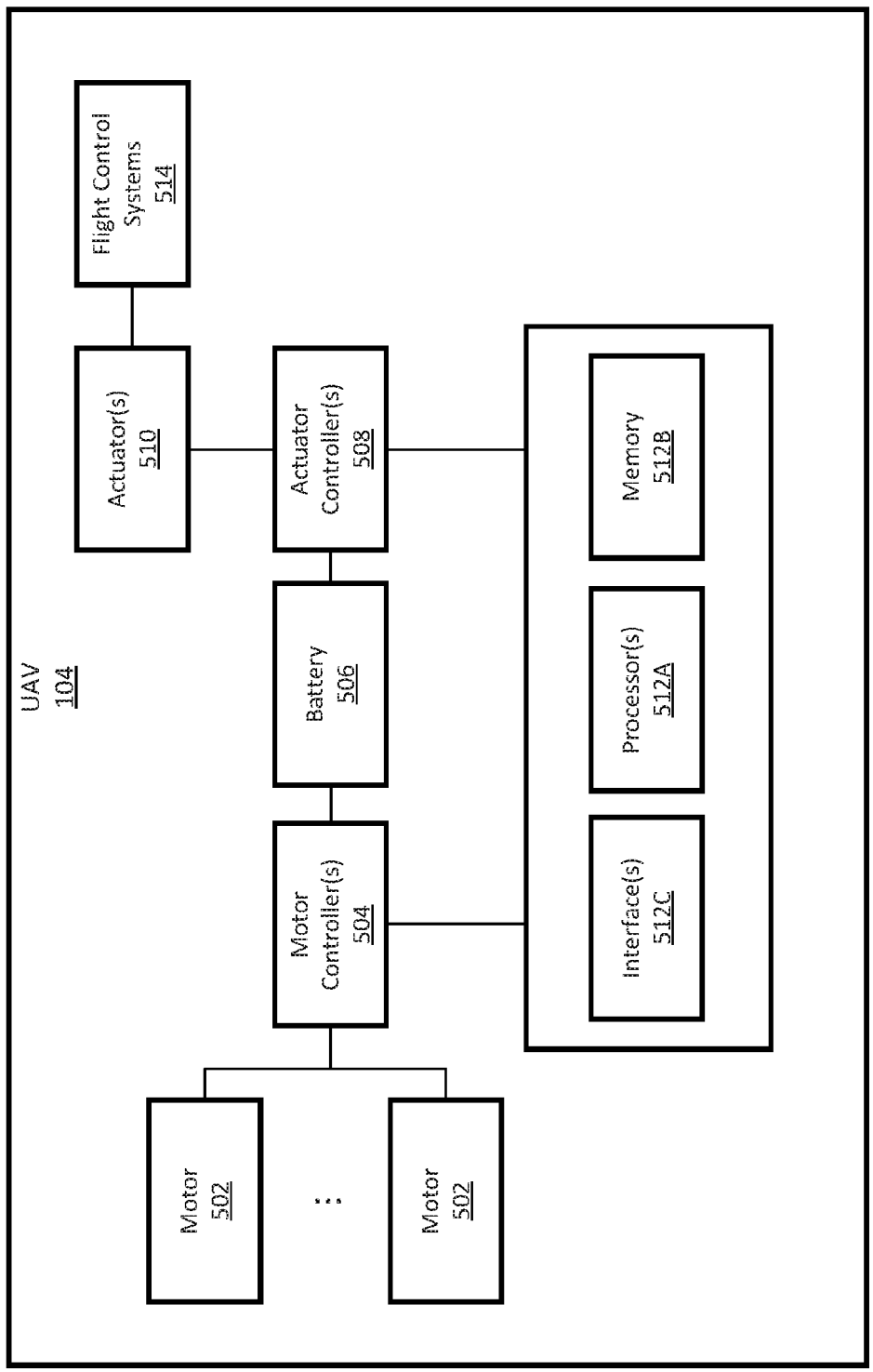
FIG. 5 illustrates a block diagram of an UAV according to one embodiment.

FIG. 5 shows a block diagram of a UAV 104 according to one example embodiment. Each element of the UAV 104 will be described by way of example below and it is understood that each UAV 104 may include more or less components than those shown and described herein.

As shown in FIG. 5, a UAV 104 may include a set of motors 502 controlled by one or more motor controllers 504, which control the speed of rotation of the motors (e.g., rounds per minute). As used herein, the term engine may be used synonymously with the term motor and shall designate a machine that converts one form of energy into mechanical energy. For example, the motors 502 may be electrical motors that convert electricity stored in the battery 506 into mechanical energy. The UAV 104 may include any number of motors 502 that are placed in any configuration relative to the body and/or an expected heading of the UAV 104. For example, the motors 502 may be configured such that the UAV 104 is a multirotor helicopter (e.g., a quadcopter). In other embodiments, the motors 502 may be configured such that the UAV 104 is a fixed wing aircraft (e.g., a single engine or dual engine airplane). In these embodiments, the motors 502, in conjunction with other elements of the UAV 104 serve to keep the UAV 104 in flight and/or propel the UAV 104 in a desired direction. In some embodiments, the UAV 104 may not include motors 502 for propelling the UAV 104 forward. In this embodiment, the UAV 104 may be a glider or lighter than air craft (e.g., a weather balloon).

As noted above, the motors 502 are controlled by one or more motor controllers 504, which govern the speed of rotation of each motor 502. In one embodiment, the motor controllers 504 may work in conjunction with actuator controllers 508 and actuators 510 that control the pitch/angle/rotation of propellers, flaps, slats, slots, rotors, rotor blades/wings, and other flight control systems 514. The motor controllers 504 and actuator controllers 508 may be managed/controlled by one or more processors 512A that are communicatively coupled to a memory 512B and one or more interfaces 512C.

In some embodiments, the memory 512B may store instructions that when executed by the processors 512A cause the UAV 104, via adjustments to settings/parameters of the motor controllers 504 and actuator controllers 508, to move in a particular direction (vertical or horizontal) or maintain a particular flight pattern (e.g., hover at a particular altitude).

The UAV 104 may communicate with one or more other devices using the one or more interfaces 512C. In one embodiment, one of the interfaces 512C in a UAV 104 may comply with a 3GPP protocol. For example, the interface 512C may adhere to one or more of Global System for Mobile communication (GSM) (including General Packet Radio Service (GPRS) and Enhanced Data Rates for GSM Evolution (EDGE)), UMTS (including High Speed Packet Access (HSPA)), and Long-Term Evolution (LTE). In some embodiments, one or more interfaces 512C in the UAV 104 may allow a UAV operator 106 and/or other parts of the UTM system 100A to control or provide plans/instructions to the UAV 104.

In one embodiment, the UAV 104 may operate in the GSM EDGE Radio Access Network (GERAN) 108A, the Universal Terrestrial Radio Access Network (UTRAN) 108B, and/or the Evolved Universal Mobile Telecommunications System (UMTS) Terrestrial Radio Access Network (E-U IRAN) 108C using one or more of the interfaces 512C. The GERAN 108A, the UTRAN 108B, and/or the E-UTRAN 108C may be administered by a network operator (e.g., a cellular network operator) and the UAV 104 may be a subscriber to one or more of these networks 108A, 108B, and 108C. The GERAN 108A, the UTRAN 108B, and/or the E-UTRAN 108C may comprise various network devices. Each of the network devices may, in some embodiments, be electronic devices that can be communicatively connected to other electronic devices on the network (e.g., other network devices, user equipment devices (such as the UAV 104), radio base stations, etc.). In certain embodiments, the network devices may include radio access features that provide wireless radio network access to other electronic devices such as user equipment devices (UEs) (for example a "radio access network device" may refer to such a network device). For example, the network devices may be base stations, such as an enhanced NodeB (eNodeB) in Long-Term Evolution (LTE), a NodeB in Wideband Code Division Multiple Access (WCDMA), or other types of base stations, as well as a Radio Network Controller (RNC), a Base Station Controller (BSC), or other types of control nodes. Each of these network devices that include radio access features to provide wireless radio network access to other electronic devices may be referred to cells (e.g., the cells 110A and 110D), towers, cellular towers, or the like. In some embodiments, an interface 512C in a UAV 104 may assist in estimating a geographical location of the UAV 104 based on communications within the GERAN 108A, the UTRAN 108B, and/or the E-U IRAN 108C.

Although described in relation to the geographical location of the UAV 104, the location information provided by the 3GPP LCS system 100B may be extended to also include additional pieces of information. For example, in addition to geographical location, the location information provided by the 3GPP LCS system 100B may also include velocity and direction/heading of the UAV 104 as estimated by the access networks GERAN 108A, UTRAN 108B, and/or E-UTRAN 108C. In some embodiments, the location information may describe an estimated current location, velocity, and/or heading of the UAV 104 or an anticipated location, velocity, and/or heading of the UAV 104. Further, although described in relation to obtaining location information from network provided location services/systems (e.g., 3GPP Location Services (LCS)), in other embodiments other location services/systems may be used (e.g., the Global Positioning System (GPS)).

A UAV operator 106 may maintain a connection with a corresponding UAV 104 via connection 138. The connection 138 may be established through one or more interfaces 512C and may form a wireless command and control (C2) connection that allows the UAV operator 106 to control the UAV 104 through direct commands and/or through issuance of a flight plan. In some embodiments, the connection 138 may additionally allow the UAV operator 106 to receive data from the UAV 104. For example, the data may include images, video streams, telemetry data, and system status (e.g., battery level/status). In some embodiments, the connection 138 may be a point-to-point (e.g., mesh) connection while in other embodiments the connection 138 between the UAV operator 106 and the UAV 104 may be part of a distributed network. In one embodiment, the connection 138 is separate from the access networks GERAN 108A, UTRAN 108B, and E-UTRAN 108C while in other embodiments the connection 134 is part of one of the access networks GERAN 108A, UTRAN 108B, and E-UTRAN 108C.

In one embodiment, the UAV 104 may maintain a connection with a UAV Service Supplier (USS) 124. For example, the UAV 104 may maintain the connection 140 with the USS 124. In some embodiments, the connection 140 may be a point-to-point connection while in other embodiments the connection 140 may be part of a distributed network. In one embodiment, the connection 140 is separate from the access networks GERAN 108A, UTRAN 108B, and E-UTRAN 108C while in other embodiments the connection 140 is part of one of the access networks GERAN 108A, UTRAN 108B, and E-UTRAN 108C. In one embodiment, the connection 140 may allow the transmission of one or more pieces of data to the USS 124, including telemetry, authentication/authorization (e.g., using a subscriber identity/identification module (SIM) based identity to check UAV 104 registrations and authorizations), reports and logs (e.g., to establish liability in case of accidents), and commands to ensure compliance and safety (e.g., land immediately). The connection 140 may alternatively provide access to a data center to provide data for storage for the UAV 104 (e.g., storage of video streams or images captured by the UAV 104).

In one embodiment, the UAV operator 106 may maintain a connection with other elements of the UTM system 100A. For example, the UAV operator 106 may maintain connection 142 with the USS 124. In some embodiments, the connection 142 may be a point-to-point connection while in other embodiments the connection 142 may be part of a distributed network. In one embodiment, the connection 142 is separate from the access networks GERAN 108A, UTRAN 108B, and E-UTRAN 108C while in other embodiments the connection 138 is part of one of the access networks GERAN 108A, UTRAN 108B, and E-UTRAN 108C.

In one embodiment, the connection 142 allows the UAV operator 106 to transmit data to or receive data from the USS 124 regarding a current, past, or future flight. For instance, the connection 142 may allow the UAV operator 106 to convey to the USS 124 one or more of the following: airspace information, alarms and notifications, authentication/authorization (e.g., use of a SIM based identity to check UAV 104 and pilot/UAV operator 106 registrations and authorizations), and reports and logs (e.g., to establish liability in case of accidents).

In some embodiments, the UAV operator 106 may transmit a proposed flight plan to the USS 124 via the connection 142. In one embodiment, the UTM system 100A may include a plurality of USSs 124. The set of USSs 124 may alternatively be referred to as a USS network. Each USS 124 offers support for safe airspace operations based on information received from a set of stakeholders and other information sources. The USSs 124 may share information about their supported operations to promote safety and to ensure that each USS 124 has a consistent view of all UAV 104 operations and thus enable the UAV 104 to stay clear of each other.

As noted above, the USSs 124 may receive information from a variety of stakeholders and information sources such that the USSs 124 may determine whether a proposed flight plan is authorized to proceed. For example, the Federal Aviation Association (FAA) may provide directives and constraints to the USSs 124 via the Flight Information Management System (FIMS) 126. The FIMS 126 provides administration officials a way to issue constraints and directives to the UAV operators 106 and/or the UAV 104 via a USS 124. Such constraints and directives may be based on information received from the National Airspace System (NAS) Air Traffic Management (ATM) system 128 and/or other NAS data sources 130. In this example, the ATM system 128 could be used to mark certain restricted areas (e.g., airports and military bases) for the UAV 104 or restrict flights over forest fire areas or other spaces which are normally permitted for the UAV 104. In addition to the airspace state and other data provided by the ATM system 128 and other NAS data sources 130, the FIMS 126 may provide impact data, which may describe effects caused by the UAV 104 to a common airspace. Although described in relation to U.S. regulatory authorities, the systems and methods described herein may be similarly applied using any regulatory authority/agency overseeing any jurisdiction/territory/airspace.

In addition to constraints and directives received from the FIMS 126, the USSs 124 may receive data from supplemental data service providers 132. These supplemental data service providers 132 may provide various pieces of data that are used by the USSs 124 in planning and authorizing a flight plan, including terrain, weather, surveillance, and performance information. The supplemental data service providers 132 may communicate amongst each other to insure consistency and accuracy of information. In some embodiments, the supplemental data service providers 132 may provide data that is presented/transmitted to UAV operators 106 via the USS 124 for the planning of a flight plan/mission.

In some embodiments, the USSs 124 may receive constraints from public safety sources 134. This information may limit UAV 104 missions over areas when such flights may negatively affect public safety. For example, UAV 104 missions may be limited over areas that are currently hosting events with large crowds of people. In some embodiments, the public safety sources 134 may provide data that is presented/transmitted to UAV operators 106 via the USS 124 for the planning of a flight plan/mission. The USSs 124 may also make UAV 104 flight/operation information available to the public 136.

As noted above, the USS 124 may determine if a proposed flight plan is authorized in view of directives, constraints, and information received from various stakeholders/sources. After concluding that the proposed flight plan is authorized or not authorized to proceed, the USS 124 may transmit a response to the UAV operator 106. In response to receiving an authorized flight plan, the UAV operator 106 may begin controlling the UAV 104 to effectuate the authorized flight plan or the UAV operator 106 may transmit the authorized flight plan or some set of instructions describing the objectives of the authorized flight plan to the UAV 104. Based on inputs from the UAV operator 106, the processor 512A together with instructions stored in the memory 512B may control the motor controllers 504 and/or actuators 510 to achieve the objectives of the flight plan.

To ensure that the UAV 104 does not deviate from the authorized flight plan, the USS 124 may make use of geographical location information (e.g., the current location of the UAV 104). In one embodiment, this location information may be received/accessed by the UTM system 100A, via a Location Service (LCS) client 122, from the 3GPP LCS system 100B. The 3GPP LCS system 100B may represent a service standardized by various organizations. For example, the 3GPP LCS system 100B may be covered under Global System for Mobile Communications (GSM) and Universal Mobile Telecommunications Service (UMTS). As described herein, the 3GPP LCS system 100B specifies network elements/entities, the functionalities of all elements/entities, interfaces for inter/intra element/entity communications, as well as messages used to implement positioning functionality in a network. The 3GPP LCS system 100B may include access to location information, such as longitude and latitude coordinates, altitude, velocity, and direction/heading of a UAV 104. In one embodiment, the location information may be provided at a prescribed interval (e.g., every minute), upon request, or in response to an event (e.g., a UAV 104 entering a specified area).

As shown, the 3GPP LCS system 100B may include a Gateway Mobile Location Centre (GMLC) 112, which contains functionality required to support location services. The GMLC 112 may act as the gateway to the 3GPP LCS system 100B for the UTM system 100A. As such, the GMLC 112 is generally the first node an external LCS client 122 of the UTM system 100A accesses when attempting to obtain location information from the 3GPP LCS system 100B. As shown, the LCS client 122 within the UTM system 100A may access/communicate with the GMLC 112 via the Le interface. In some embodiments, the Le interface may require extensions to provide additional information (e.g., altitude information to provide three-dimensional geo-fencing zones). The GMLC 112 may be network/network operator specific and each network may include one or more GMLCs 112.

In one embodiment, the LCS client 122 may facilitate the transmission of flight information to the 3GPP LCS 100B via the GMLC 112. For example, the flight information may include a flight plan for the UAV 104, which was approved by the UTM system 100A. As will be described in greater detail below, the flight plan, including a flight path of the UAV 104, may be used for reserving radio/network resources on multiple cells 110 in one or more access network 108.

In one embodiment, the GMLC 112 may be communicatively coupled to various support services, including a Home Subscriber Server (HSS) 116, a Privacy Profile Register (PPR) 118, and a Pseudonym Mediation Device (PMD) 120. For example, the GMLC 112 may request information from the HSS 116 via the Lh or SLh interfaces. The HSS 116 may contain or have access to a master user database that supports network access. For example, the HSS 116 may contain or have access to subscription-related information (subscriber profiles) for performing authentication and authorization of users (e.g., authentication of an account associated with an interface 512C of the UAV 104). In some embodiments, the HSS 116 can provide information about the subscriber's location and Internet Protocol (IP) information. In some embodiments, the HSS 116 may function similarly to a GSM home location register (HLR) and/or an Authentication Centre (AuC).

In some embodiments, the UTM system 100A may request and receive network subscription information associated with a UAV 104. In particular, since the 3GPP LCS system 100B is network operator specific, the UTM system 100A must be aware of which network operator and what account is associated with a UAV 104. Upon receipt of network subscription information associated with a UAV 104, the LCS client 122 may pass along this information to an applicable GMLC 112 (e.g., a GMLC 112 associated with the network operator designated in the received subscription information). A GMLC 112 that received this information may work in conjunction with the HSS 116 and/or another support service in the 3GPP LCS system 100B to access location information associated with the applicable UAV 104.

In some embodiments, the GMLC 112 may utilize the PPR 118 to perform a privacy check via the Lpp interface. In some embodiments, the HSS 116 may provide the GMLC 112 with an address to access the PPR 118. Although shown as separate, in some embodiments, the PPR 118 may be integrated within the GMLC 112.

In some embodiments, the GMLC 112 may utilize the PMD 120 to translate a pseudonym of a target UAV 104 with a verinym/true identity (e.g., International Mobile Subscriber Identity or Mobile Station Integrated Services Data Network) via the Lid interface. The PMD 120 may be separate from the GMLC 112 and the PPR 118 or integrated within either.

The GMLC 112 may send positioning/location requests to various controllers 114 associated with separate access networks 108. In response to the requests, the controllers 114 coordinate and submit final location estimates of a corresponding UAV 104 to the GMLC 112. In some embodiments, the GMLC 112 may communicate via the Lg (Mobile Application Part-based) or Lgd (Diameter-based) interfaces with a 2G Serving General Packet Radio Service (GPRS) Support Node (SGSN) 114A or via the Lg interface with a 2G Mobile services Switching Centre (MSC) 114B for a GSM EDGE Radio Access Network (GERAN) 108A. In this embodiment, the 2G-SGSN 114A may communicate with the GERAN 108A via the Gb interface and the 2G-MSC 114B may communicate with the GERAN 108A via the A interface. The 2G-SGSN 114A and the 2G-MSC 114B may manage charging/billing, location request management, authorization of location services, and general operation of location services for the GERAN 108A.

In some embodiments, the GMLC 112 may communicate via the Lg or Lgd interfaces with a 3G-SGSN 114C or via the Lg interface with an MSC server 114D for a Universal Terrestrial Radio Access Network (UTRAN) 108B. In this embodiment, the 3G-SGSN 114C and the MSC server 114D may communicate with the UTRAN 108B via the Iu interface. The 3G-SGSN 114C and the MSC server 114D may manage charging/billing, location request management, authorization of location services, and general operation of location services for the UTRAN 108B.

In some embodiments, the GMLC 112 may communicate via the SLg interface with a Mobility Management Entity (MME) 114E of an Evolved Universal Mobile Telecommunications System (UMTS) Terrestrial Radio Access Network (E-UTRAN) 108C. In this embodiment, the MME 114E may communicate with the E-UTRAN 108C via the S1 interface. The MME 114E may manage charging/billing, location request management, authorization of the LCS services, and general operation of location services for the E-UTRAN 108C.

As noted above, the access networks GERAN 108A, UTRAN 108B, and E-UTRAN 108C may estimate the location of a UAV 104 and make this location information available to other systems (e.g., the UTM system 100A). In particular, the access networks GERAN 108A, UTRAN 108B, and E-UTRAN 108C, that facilitate determination of the locations of user equipment (e.g., the UAV 104), are able to exchange location information with the core network (e.g., the controllers 114 and/or the GMLC 112) when connected to the core network. Location information may also be communicated between GMLCs 112, located in the same or a different public land mobile network (PLMN), via the specified GMLC to GMLC interface.

As noted above, the UTM system 100A may include a LCS client 122. The LCS client 122 may bridge the UTM system 100A and the 3GPP LCS system 100B to allow air traffic system 100 to manage flights of the UAV 104 based on the location information provided by the 3GPP LCS system 100B. In particular, the UTM system 100A may ensure that the UAV 104 adhere to directives, constraints, approved flight plans, approved deviations, and other rules and regulations based on locations provided in real time via the LCS client 122 and the GMLC 112.

In one embodiment, the UTM system 100A may make a flight plan, including a flight path, available to a controller 114 of a corresponding access network to which the UAV 104 is currently connected via the connection 144. Providing the flight path to one or more controllers 114 allows the controllers 114 to manage reservation of network/radio resources in a more efficient manner. In particular, as described in greater detail below, the controllers 114 and/or the GMLC 112 may reserve network/radio resources for a single UAV 104 across multiple cells 110 in the access networks GERAN 108A, UTRAN 108B, and E-UTRAN 108C for the same or at least a partially overlapping time period. Although the UAV 104 may only connect to a single cell 110 at any particular time, reservation of radio/network resources across multiple cells reduces potential interference to other pieces of user equipment operating in the networks 108 as well as the UAV 104.

In some embodiments, one or more of the portions of the air traffic system 100 may be implemented through virtualization. For example, a cloud execution environment (e.g., one or more virtual machines or containers) may be used by the GMLC 112 to manage requests from the LCS client 122.

Figure 6:
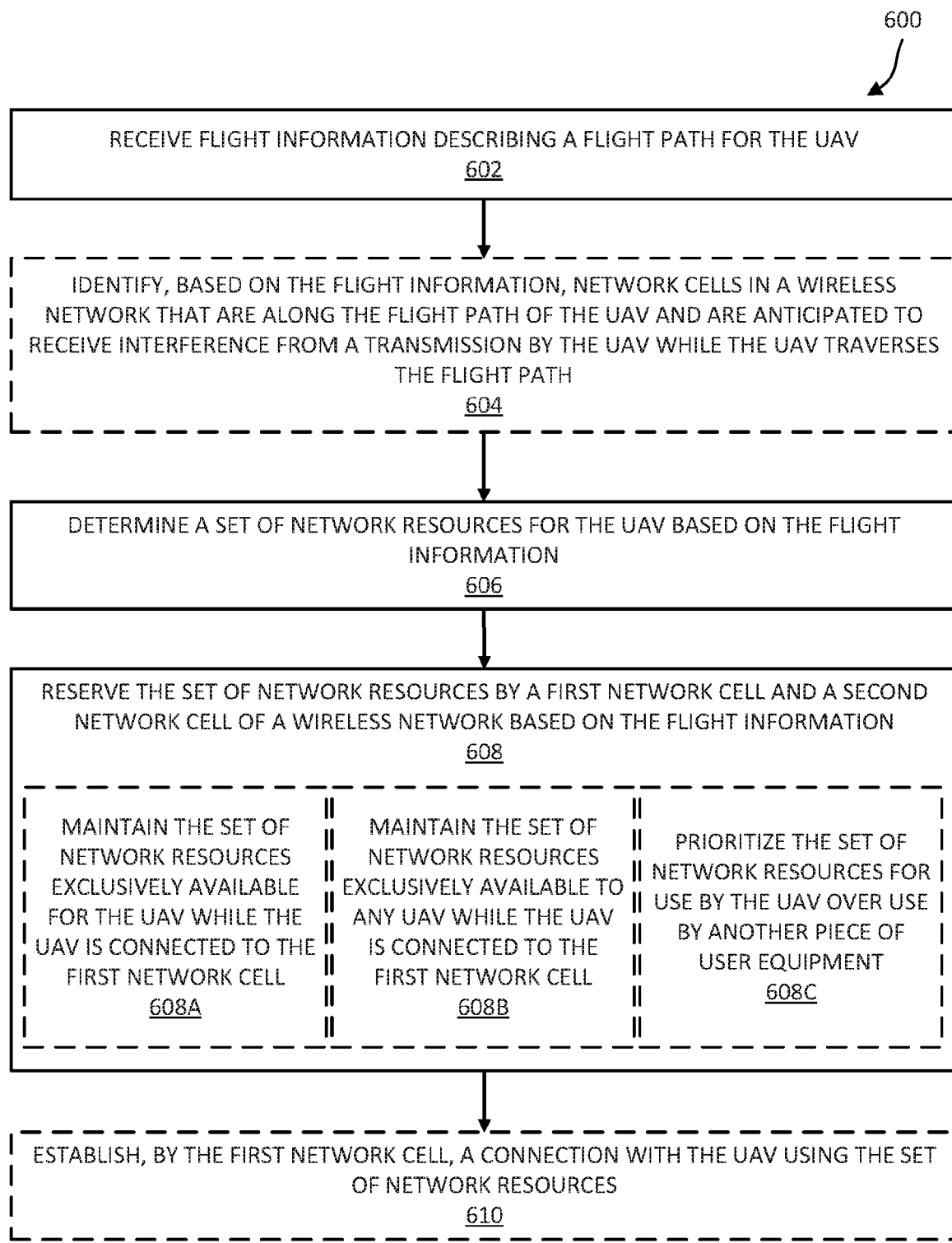
FIG. 6 illustrates a method for managing a wireless connection of the UAV according to one embodiment.

Turning now to FIG. 6, a method 600 for managing a wireless connection of the UAV 104 according to one embodiment will be discussed. As will be described below, the method 600 may utilize flight information received from the UTM system 100A to reserve radio/network resources for the UAV 104 on multiple cells 110 in a wireless network 108. Although shown and described in a particular order, in some embodiments, the operations of the method 600 may be performed in a different order. For example, in some embodiments, one or more operations of the method 600 may be performed simultaneously or in partially overlapping time periods.

Each operation of the method 600 may be performed by one or more components of the air traffic system 100. For example, the operations of the method 600 may be performed by one or more of the GMLC 112, one or more of the controllers 114, one or more cells 110, the LCS client 122, a supplemental data service provider 132, and the USS 124.

In one embodiment, the method 600 may commence at operation 602 with receipt of flight information describing a flight path of the UAV 104. In one embodiment, the flight information may be received at operation 602 by the GMLC 112. In some embodiments, the flight information may be transmitted to the GMLC 112 via the LCS client 122 of the UTM system 100A. In other embodiments, the flight information may be transmitted by the UTM system 100A to the GMLC 112 via another component of the UTM system 100A other than the LCS client 122 (e.g., an application function of the UTM system 100A).

Figure 2:
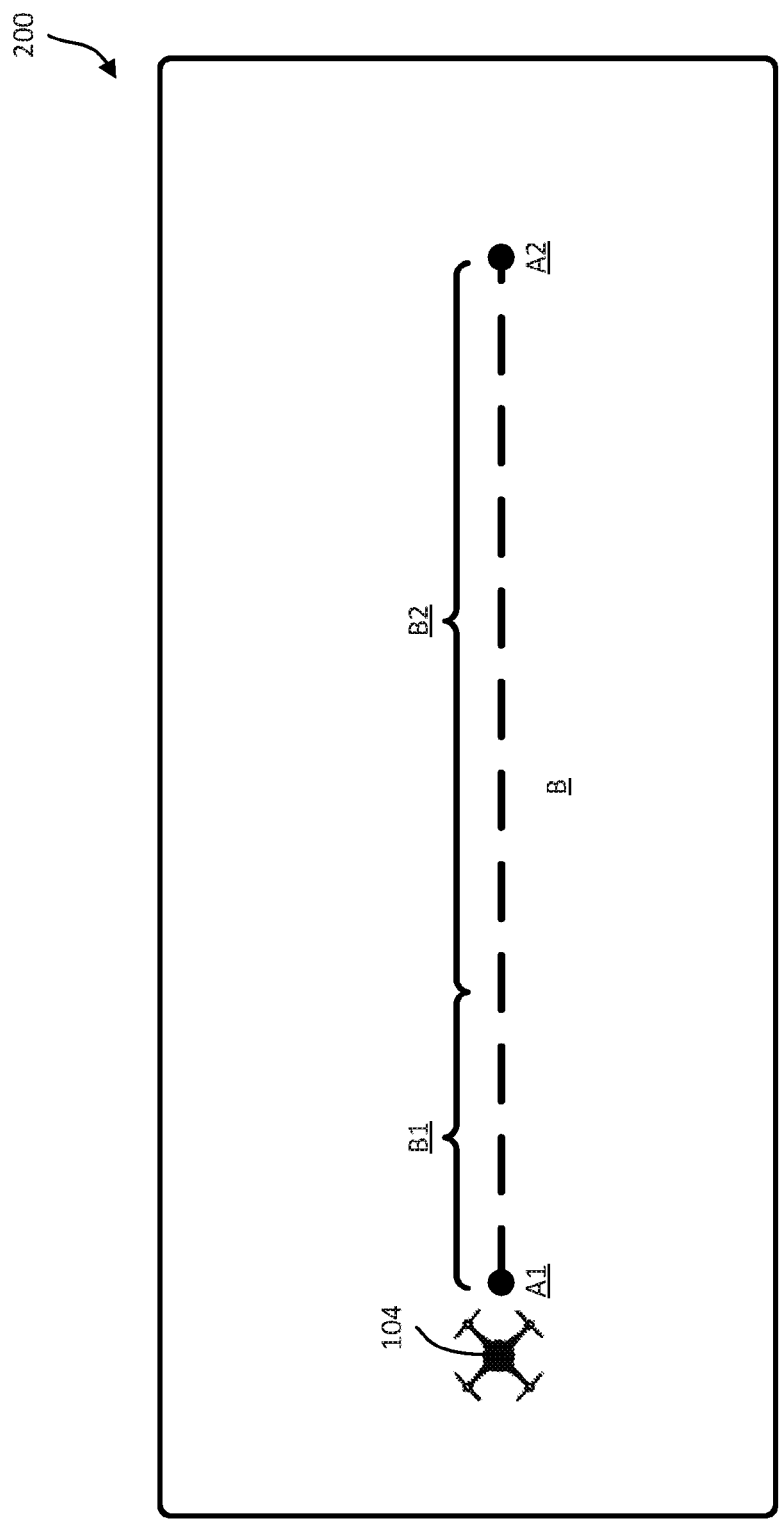
FIG. 2 illustrates an example flight plan with a set of coordinates according to one embodiment.

As noted above, the flight information describes a flight path of the UAV 104. In one embodiment, a flight path may be defined/described by one or more of a starting point, an ending point, and a set of waypoints, where each point is defined by longitudinal and latitudinal coordinates. For example, FIG. 2 shows a flight path B that includes a starting point A1 and an ending point A2. In some embodiments, the flight path may be defined/described using a set of restricted (no-fly) zones (e.g., the set of restricted zones 302A and 302B shown in FIG. 3). In still more embodiments, the flight path may be defined/described using a set of clearance (fly only) zones (e.g., the clearance zone 402 shown in FIG. 4).

In some embodiments, the flight information received at operation 602 may include information in addition to description of a flight path. For example, the flight information may include flight plan information, which in addition to flight path information, may include a set of velocities, a set of altitudes, a set of headings/directions, a set of events (e.g., capture video at prescribed times or locations, hover over an area for a specified interval, etc.), and/or a time/expiration/duration for the flight plan.

Following receipt of flight information describing a flight path of the UAV 104, operation 604 may identify, based on the flight information, network cells 110 in a wireless network 108 that are along the flight path of the UAV 104 and are anticipated to receive interference from a transmission by the UAV 104 while the UAV 104 traverses the flight path. In some embodiments, the determination at operation 604 may be extended to interference that will potentially be experienced by the UAV 104 or another piece of user equipment in the wireless network 108. The interference referred to herein may be caused by transmissions by a piece of user equipment (e.g., the UAV 104) and/or a cell 110 in the wireless network 108. The interference may be in a fully or partially overlapping network resource (e.g., frequency and time period). For example, a signal from the UAV 104 may reach both a cell 110, with which the UAV 104 is currently connected, and a cell 110 that the UAV 104 is not presently connected. The signal may cause or otherwise be viewed as interference to the cell 110 with which the UAV 104 is not presently connected. In some embodiments, interference may only be caused when the strength of the signal is above a prescribed level (e.g., 10 dB). The strength of the signal may be related to the distance between the source of the transmission (e.g., the UAV 104) and the unintended recipient and/or any obstructions between the source and the unintended recipient.

Figure 7:
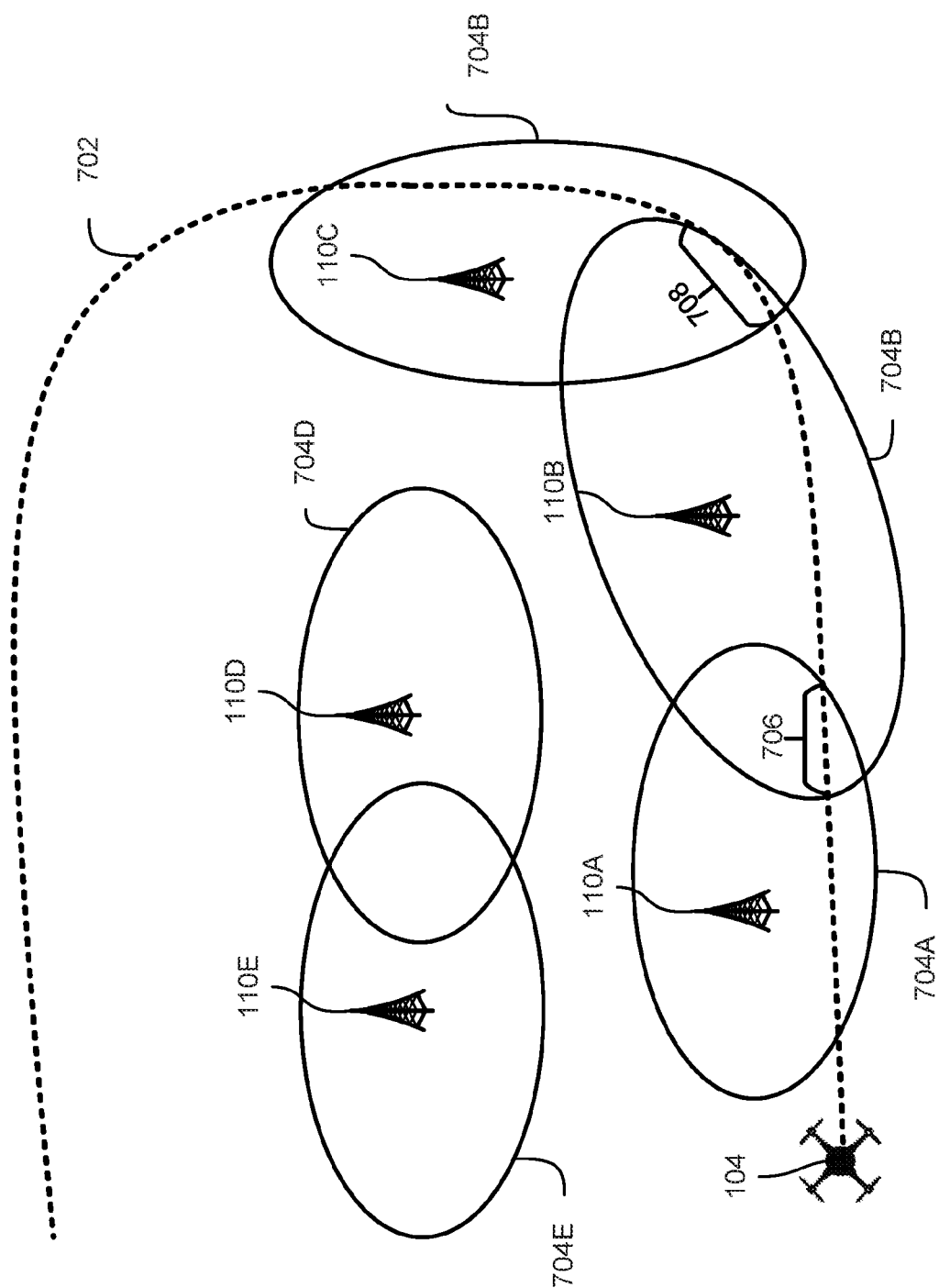
FIG. 7 illustrates a flight path of a UAV traversing a set of cells in a wireless network according to one embodiment.

In one embodiment, cells 110 may be identified at operation 604 using geographic location information of cells 110 in the wireless network 108 along with geographic information of the flight path of the UAV 104. For example, as shown in FIG. 7, the flight path 702 of the UAV 104 may traverse the areas 704A, 704B, and 704C of the cells 110A, 110B, and 110C but the flight path may fall outside the areas 704D and 704E of the cells 110D and 110E. In this example embodiment, the areas 704 describe zones in which interference may be experienced by the cells 110, pieces of user equipment associated with the respective cells 110, or the UAV 104. After determining geographical location information of cells 110 operating in the network 108 and of the flight path of the UAV 104, operation 604 may identify the cells 110A, 110B, and 110C as cells 110 that may experience or cause interference.

In some embodiments, identified cells 110 from operation 604 may change over time. For example, using the example of FIG. 7, the flight path 702 may include the subsections 706 and 708. During subsection 706 of the flight path 702, the UAV 104 will be in both areas 704A and 704B. Accordingly, operation 604 may identify cells 110A and 110B for the subsection 706 of the flight path 702. However, during subsection 708 of the flight path 702, the UAV 104 will be in both areas 704B and 704C. Accordingly, operation 604 may identify cells 110B and 110C for the subsection 708 of the flight path 702.

Figure 8:
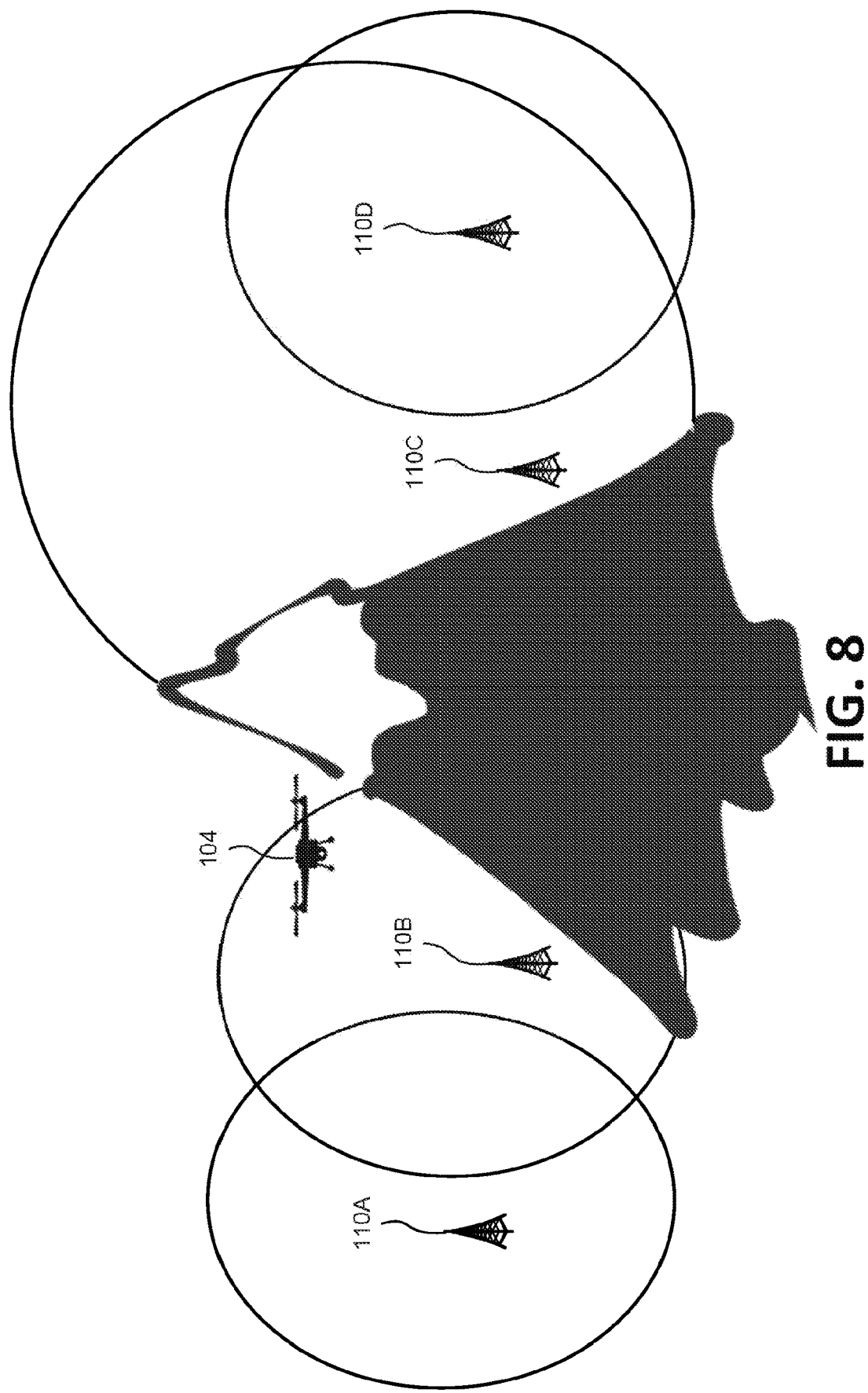
FIG. 8 illustrates an obstruction within a wireless network according to one embodiment.

Although described in relation to two-dimensional distances from a cell 110, as noted above, interference may be determined to be caused by the terrain/obstructions separating the UAV 104 from particular cells 110. Traditionally, transmissions from a piece of user equipment or from a cell 110 is lessened based on objects/obstructions located/originating at ground level. For example, buildings, mountains, and other large objects prevent radio transmissions to radiate for long distances. However, since UAVs 104 operate at high altitudes, transmissions from these UAVs 104 may avoid these obstructions and be allowed to radiate for larger distances. Similarly, transmissions from cells 110 may be allowed to radiate without obstructions to UAVs 104 operating at high altitudes. For example, as shown in FIG. 8, the UAV 104 may be located on one side of a mountain with a set of cells 110A and 110B. Another set of cells 110C and 110D may be located on the other side of the mountain. Although the UAV 104 would likely cause interference to the cell 110C and the cell 110C would cause interference to the UAV 104 if the mountain were not present, the mountain blocks transmissions radiating from the UAV 104 and the cell 110C and thus would not provide interference to each other. If the UAV 104 were to climb/rise to a higher altitude such that the mountain no longer blocks transmissions from the UAV 104 and the cell 110C, the cell 110C may be identified at operation 604. Accordingly, operation 604 may take into account terrain information and the expected altitude of the UAV 104 along the with the two-dimensional location (e.g., longitude and latitude) of the UAV 104 when identifying network cells 110 that may cause interference at operation 604.

In one embodiment, identifying cells 110 at operation 604 that may cause interference may be performed by identifying cells 110 that maintain a line-of-sight with the UAV 104 based on the location (e.g., latitude, longitude, and altitude) and/or angle of the UAV 104 relative to the cells 110. In one embodiment, this identification may take into account the transmission strength of the UAV 104 and/or the cells 110.

In some embodiments, the cells 110 identified at operation 604 may be used for providing a connection to the access network 108. For instance, in the scenario of FIG. 7, the cells 110A and 110B may be identified as cells 110 to experience interference at operation 604. In this example, the UAV 104 may connect with cell 110A during subsection 706 and may connect with cell 110C during subsection 708.

In one embodiment, location services (LCS) may be provided by the 3GPP LCS system 100B for determining the location of cells 110 in the access network 108 and/or the anticipated locations of the UAV 104 based on the flight information. In one embodiment, operation 604 may be performed by the GMLC 112 based on inputs from one or more of the LCS client 122 and the controllers 114.

Figure 9:
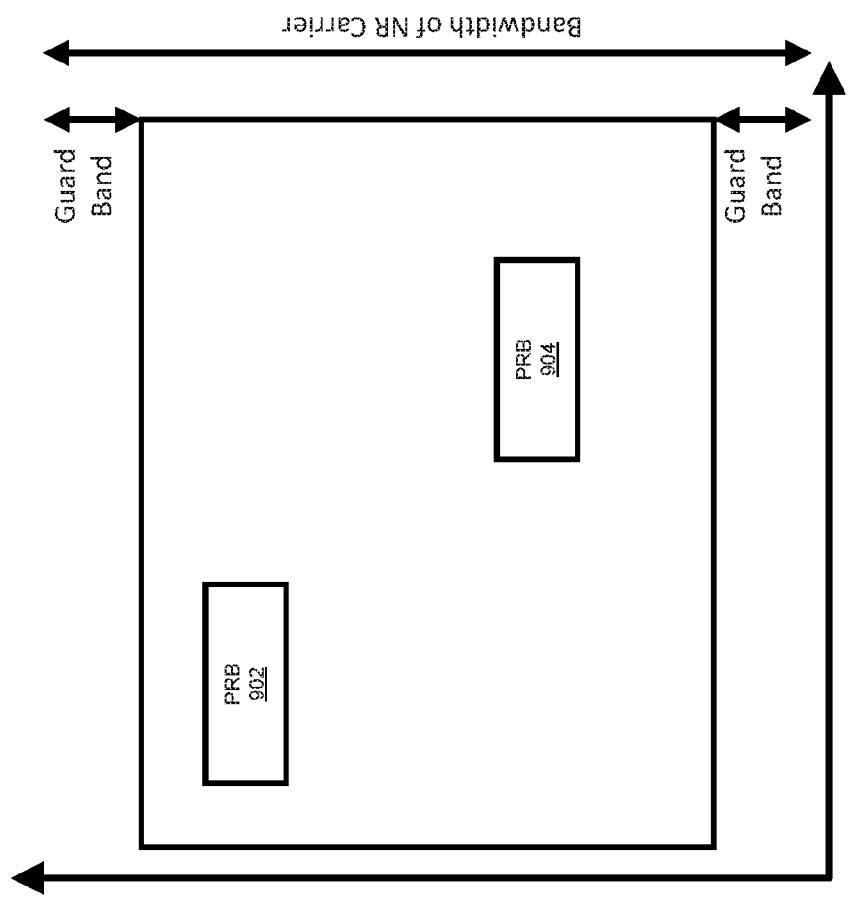
FIG. 9 illustrates two network resources/Physical Resource Block (PRB) pairs according to one embodiment.

At operation 606, a set of radio/network resources may be determined for the UAV 104 based on the flight information. In one embodiment, a radio/network resource is a frequency allocation over a certain period of time. For example, in Long-Term Evolution (LTE), a basic network resource unit is referred to as a Physical Resource Block (PRB) pair (e.g., 180 kHz over one millisecond(ms)). A piece of user equipment may be allocated a number of PRB pairs. For example, a single piece of user equipment may be allocated one or more PRB pairs along a frequency dimension (e.g., each PRB pair shares the same time period but a different frequency band), a time dimension (e.g., each PRB pair shares the same frequency band but in different time periods), or both frequency and time dimensions (e.g., each PRB pair is assigned a different frequency band and time period). FIG. 9 shows two PRB pairs 902 and 904 according to one embodiment.

Figure 10:
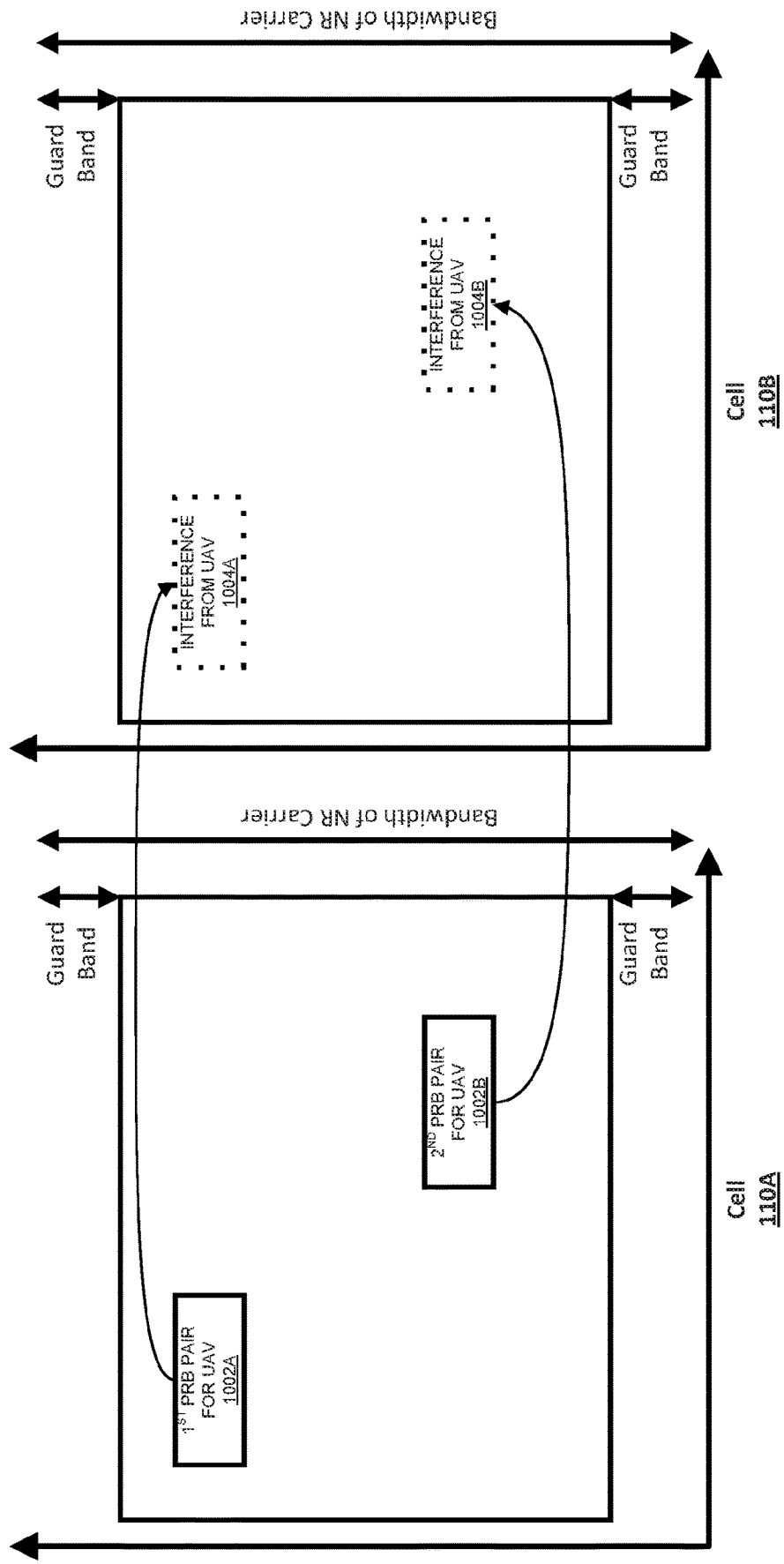
FIG. 10 illustrates interference from two network resources/PRB pairs from one cell to another cell in a wireless network according to one embodiment.

Traditionally, a PRB pair assigned/allocated to a first piece of user equipment in a first cell 110 may be assigned/allocated to a second piece of user equipment in a second cell 110. As noted above, since UAVs 104 may operate at high altitudes, signals from the UAV 104 may radiate across far distances without obstruction. Similarly, signals from other devices (e.g., other pieces of user equipment and/or cells 110) may radiate to the UAV 104 across far distances without obstructions. This free radiation of signals may cause interference that would not traditionally be caused or experienced by user equipment operated at ground level. This interference is shown in FIG. 10 in which a first PRB pair 1002A and a second PRB pair 1002B assigned to a UAV 104 by a first cell 110A causes interference 1004A and 1004B in a second cell 110B. In this example, the interference 1004A shares a same frequency band and time period as the PRB pair 1002A and the interference 1004B shares a same frequency band and time period as the PRB pair 1002B. Such interference degrades the quality-of-service for all pieces of user equipment, including UAVs 104. In particular, reliability and reception quality of command and control (C2) and sensor links for the UAV 104 may be severely impacted by the interference described above. This may result in unsafe conditions as a UAV operator 106 may be unable to properly control the UAV 104 during a flight mission.

To eliminate this interference, operation 606 may determine/select a set of network resources for the UAV 104 based on flight information of the UAV 104. For example, in one embodiment, the network resources may be selected to take into account the different cells 110 that may be the victim or cause of interference in relation to the UAV 104 while following the indicated flight path as indicated at operation 604. For instance, network resources may be selected at operation 606 that are not assigned to any user equipment in one or more cells 110 identified at operation 604. In one embodiment, operation 604 may be performed by one or more of the GMLC 112 and the controllers 114.

Figure 11:
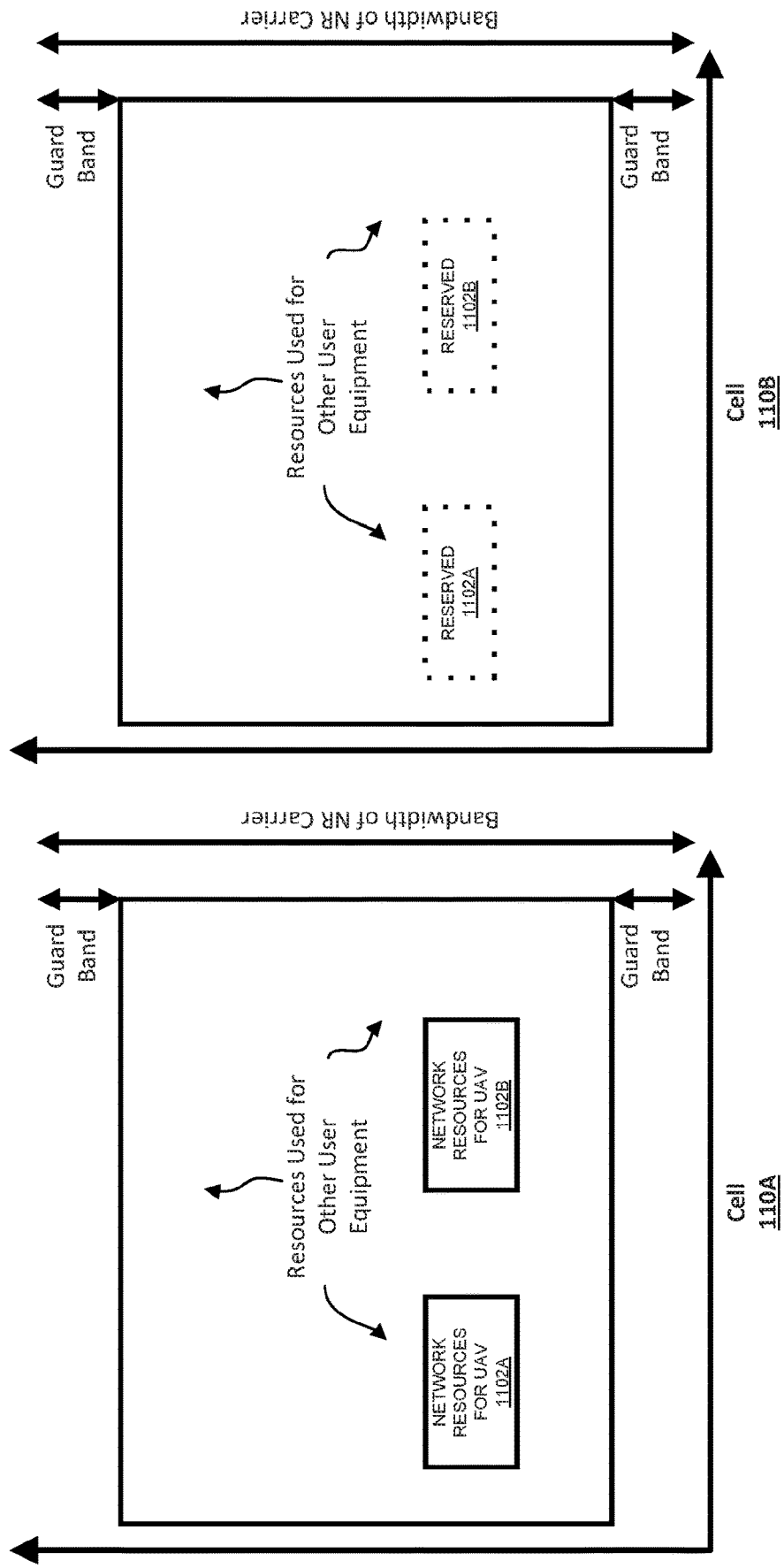
FIG. 11 illustrates reservation of two network resources/PRB pairs in separate cells of a wireless network according to one embodiment.

Following determining/identifying network resources for the UAV 104, operation 608 may reserve the determined network resources across multiple network cells 110. For example, as shown in FIG. 11, a first network resource 1102A and a second network resource 1102B may be reserved in both cell 110A and cell 110B for the same UAV 104. Although the UAV 104 may only connect with a single cell 110 (e.g., the cell 110A) to utilize these network resources 1102A and 1102B, reserving the resources in multiple cells will prevent (1) the other cell 110 (e.g., the cell 110B) from transmitting using the resources 1102A and 1102B, which would cause interference to the UAV 104; (2) another piece of user equipment from transmitting using the resources 1102A and 1102B, which would cause interference to the UAV 104; (3) another piece of user equipment from listening for transmissions using the resources 1102A and 1102B, which would cause interference to the piece of user equipment based on transmissions from the UAV 104; and (4) the cell 110 not connected with the UAV 104 (e.g., the cell 110B) from listening for transmissions using the resources 1102A and 1102B, which would cause interference to the cell 110 based on transmissions from the UAV 104.

As noted above, although the network resources are reserved across multiple cells 110, the UAV 104 may only connect with a single cell 110 at any given time to communicate (e.g., transmit and/or receive) using the reserved network resources. The remaining cells 110, with which the UAV 104 is not currently connected, reserves the resources determined at operation 606 but without their explicit/overt use.

In some embodiments, the cells 110 reserving the resources but without the UAV 104 currently attached (referred hereinafter as "unconnected cells 110") may use various criteria or rules for the reservation. In one embodiment, a strict reservation rule is used such that the unconnected cells 110 may not allow any other piece of user equipment, including other UAVs 104, to utilize the reserved network resources.

In another embodiment, the reserved network resources, in relation to the unconnected cells 110, may be assigned to or otherwise utilized by any UAV 104. Accordingly, unconnected cells 110 may use the network resources to connect with UAVs 104, but non-UAV user equipment are not permitted to utilize the reserved network resources.

In still another embodiment, the reserved network resources may be prioritized for the UAV 104 and/or deprioritized but allowed for all user equipment (both UAVs 104 and non-UAVs). For example, unconnected cells 110 or controllers 114 may attempt to assign other network resources outside the reserved network resources for pieces of user equipment, including other UAVs 104. However, if assignment of other network resources is unsuccessful, then the unconnected cells 110 may assign the reserved network resources to a piece of user equipment. In some embodiments, reserved network resources may only be assigned to another piece of user equipment when such an assignment would not negatively affect connectivity or quality-of-service. For example, a reserved network resource may only be allocated to pieces of user equipment that do not demand high data rates (e.g., voice users).

At operation 610, the UAV 104 may connect with one cell 110 in the wireless network 108. In one embodiment, the UAV 104 may establish a connection with one of the cells 110 identified at operation 604 while the other remaining cells (e.g., the unconnected cells 110) continue to reserve the network resources identified at operation 606.

As described above, the method 600 reduces or eliminates interference experienced by or caused by the UAV 104. In particular, by reserving network resources for the UAV 104 in multiple cells 110, the method 600 ensures that signals that are allowed to propagate unobstructed from or to the UAV 104 based on the high operating altitude of the UAV 104 do not cause interference in the wireless network 108. By reducing interference, quality-of-service in the wireless network 108 is increased and potential safety issues with command and control links are mitigated.

Figure 12:
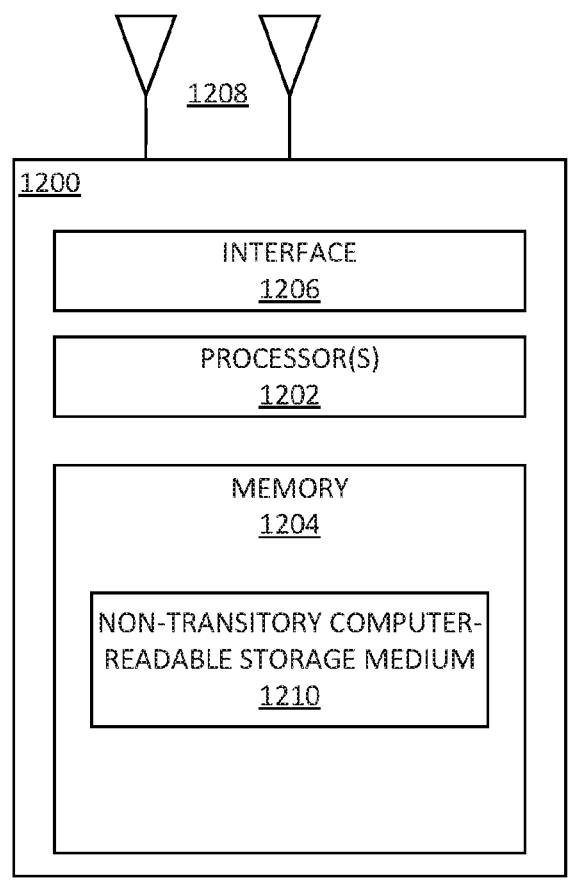
FIG. 12 illustrates a computing/networking device according to one embodiment.

Each element of the air traffic system 100 may be composed of or otherwise implemented by a set of computing/networking devices. For example, FIG. 12, illustrates a computing/networking device 1200 according to one embodiment. As shown the computing/networking device 1200 may include a processor 1202 communicatively coupled to a memory 1204 and an interface 1206. The processor 1202 may be a microprocessor, controller, microcontroller, central processing unit, digital signal processor, application specific integrated circuit, field programmable gate array, any other type of electronic circuitry, or any combination of one or more of the preceding. The processor 1202 may comprise one or more processor cores. In particular embodiments, some or all of the functionality described herein as being provided by a component of the air traffic system 100 may be implemented by one or more processors 1202 of one or more computing/networking devices 1200 executing software instructions, either alone or in conjunction with other computing/networking devices 1200 components, such as the memory 1204.

The memory 1204 may store code (which is composed of software instructions and which is sometimes referred to as computer program code or a computer program) and/or data using non-transitory machine-readable (e.g., computer-readable) media 1210, such as a non-transitory computer-readable storage medium (e.g., magnetic disks, optical disks, solid state drives, read only memory (ROM), flash memory devices, phase change memory) and machine-readable transmission media (e.g., electrical, optical, radio, acoustical or other form of propagated signals—such as carrier waves, infrared signals). For instance, the memory 1204 may comprise non-volatile memory containing code to be executed by the processor 1202. Where the memory 1204 is non-volatile, the code and/or data stored therein can persist even when the computing/networking device 1200 is turned off (when power is removed). In some instances, while the computing/networking device 1200 is turned on, that part of the code that is to be executed by the processor(s) 1202 may be copied from non-volatile memory into volatile memory (e.g., dynamic random-access memory (DRAM), static random access memory (SRAM)) of the computing/networking device 1200.

The interface 1206 may be used in the wired and/or wireless communication of signaling and/or data to or from computing/networking device 1200. For example, interface 1206 may perform any formatting, coding, or translating to allow computing/networking device 1200 to send and receive data whether over a wired and/or a wireless connection. In some embodiments, the interface 1206 may comprise radio circuitry capable of receiving data from other devices in the network over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via the antennas 1208 to the appropriate recipient(s). In some embodiments, interface 1206 may comprise network interface controller(s) (NICs), also known as a network interface card, network adapter, local area network (LAN) adapter or physical network interface. The NIC(s) may facilitate in connecting the computing/networking device 1200 to other devices allowing them to communicate via wire through plugging in a cable to a physical port connected to a NIC. In particular embodiments, the processor 1202 may represent part of the interface 1206, and some or all of the functionality described as being provided by the interface 1206 may be provided in part or in whole by the processor 1202.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

Additionally, while the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for managing a wireless connection of an Unmanned Aerial Vehicle (UAV), the method comprising:
   receiving flight information describing a flight path for the UAV;
   identifying, based on the flight information, network cells of a wireless network that are along the flight path of the UAV and are anticipated to receive interference from a transmission by the UAV while the UAV traverses the flight path, and in which a network cell is anticipated to receive interference from the UAV when, based on an expected altitude and an expected angle relative to the network cell along a portion of the flight path, the UAV will have a line-of-sight path to the network cell, wherein the identified network cells include a first network cell and a second network cell where the flight path for the UAV transitions a coverage area overlapped by the first network cell and the second network cell of the wireless network where interference is anticipated;
   determining a set of network resources that are unused for the first network cell and the second network cell where the flight path for the UAV transitions the coverage area overlapped by the first network cell and the second network cell; and
   reserving, for the UAV, the set of network resources for the first network cell and the second network cell, based on the flight information for at least a period when the UAV transitions the coverage area to reduce interference, wherein the set of network resources comprises one or more Physical Resource Blocks (PRBs), each PRB having a specified frequency band along a frequency dimension and a specified time period over a time dimension, and wherein reserving the set of network resources reserves corresponding PRBs having same specified frequency band and time period for both the first network cell and the second network cell.

2. The method of claim 1, further comprising:
   establishing, by the first network cell, a connection with the UAV using the set of network resources.

3. The method of claim 2, wherein reserving the set of network resources by the second network cell further comprises:

maintaining the set of network resources exclusively available for the UAV while the UAV is connected to the first network cell but not connected to the second network cell.

4. The method of claim 2, wherein reserving the set of network resources by the second network cell further comprises:
maintaining the set of network resources exclusively available to any UAV while the UAV is connected to the first network cell but not connected to the second network cell.

5. The method of claim 2, wherein reserving the set of network resources by the second network cell further comprises:
prioritizing the set of network resources for use by the UAV over use by another piece of user equipment,
wherein the prioritizing causes the wireless network to attempt to allocate network resources for the another piece of user equipment outside the set of network resources prior to being allocated the set of network resources.

6. The method of claim 1, wherein the wireless network is a 3rd Generation Partnership Project (3GPP) network and the first network cell and the second network cell are enhanced NodeBs.

7. The method of claim 1, wherein the flight path is received from a UAV traffic management system and the UAV traffic management system manages an airspace traversed by the flight path and the UAV traffic management system approved the flight path.

8. A non-transitory computer-readable storage medium storing instructions which, when executed by a set of one or more processors of a computing device, cause the computing device to perform operations comprising:
receiving flight information describing a flight path for an unmanned aerial vehicle (UAV);
identifying, based on the flight information, network cells of a wireless network that are along the flight path of the UAV and are anticipated to receive interference from a transmission by the UAV while the UAV traverses the flight path, and in which a network cell is anticipated to receive interference from the UAV when, based on an expected altitude and an expected angle relative to the network cell along a portion of the flight path, the UAV will have a line-of-sight path to the network cell, wherein the identified network cells include a first network cell and a second network cell where the flight path for the UAV transitions a coverage area overlapped by the first network cell and the second network cell of the wireless network where interference is anticipated;
determining a set of network resources that are unused for the first network cell and the second network cell where the flight path for the UAV transitions the coverage area overlapped by the first network cell and the second network cell; and
reserving, for the UAV, the set of network resources for the first network cell and the second network cell, based on the flight information for at least a period when the UAV transitions the coverage area to reduce interference, wherein the set of network resources comprises one or more Physical Resource Blocks (PRBs), each PRB having a specified frequency band along a frequency dimension and a specified time period over a time dimension, and wherein to reserve the set of network resources reserves corresponding PRBs having same specified frequency band and time period for both the first network cell and the second network cell.

9. The non-transitory computer-readable storage medium of claim 8, wherein the instructions further cause the computing device to perform operations comprising:
establishing, by the first network cell, a connection with the UAV using the set of network resources.

10. The non-transitory computer-readable storage medium of claim 9, wherein reserving the set of network resources by the second network cell further comprises:
maintaining the set of network resources exclusively available for the UAV while the UAV is connected to the first network cell but not connected to the second network cell.

11. The non-transitory computer-readable storage medium of claim 9, wherein reserving the set of network resources by the second network cell further comprises:
maintaining the set of network resources exclusively available to any UAV while the UAV is connected to the first network cell but not connected to the second network cell.

12. The non-transitory computer-readable storage medium of claim 9, wherein reserving the set of network resources by the second network cell further comprises:
prioritizing the set of network resources for use by the UAV over use by another piece of user equipment,
wherein the prioritizing causes the wireless network to attempt to allocate network resources for the another piece of user equipment outside the set of network resources prior to being allocated the set of network resources.

13. The non-transitory computer-readable storage medium of claim 8, wherein the flight path is received from a UAV traffic management system and the UAV traffic management system manages an airspace traversed by the flight path and the UAV traffic management system approved the flight path.

14. A network device for managing a wireless connection of an Unmanned Aerial Vehicle (UAV), comprising:
a processor; and
a memory coupled to the processor, wherein the memory includes one or more instructions that when executed by the processor cause the network device to:
receive flight information describing a flight path for the UAV;
identify, based on the flight information, network cells of a wireless network that are along the flight path of the UAV and are anticipated to receive interference from a transmission by the UAV while the UAV traverses the flight path, and in which a network cell is anticipated to receive interference from the UAV when, based on an expected altitude and an expected angle relative to the network cell along a portion of the flight path, the UAV will have a line-of-sight path to the network cell, wherein the identified network cells include a first network cell and a second network cell where the flight path for the UAV transitions a coverage area overlapped by the first network cell and the second network cell of the wireless network where interference is anticipated;
determine a set of network resources that are unused for the first network cell and the second network cell where the flight path for the UAV transitions the coverage area overlapped by the first network cell and the second network cell; and
reserve, for the UAV, the set of network resources for the first network cell and the second network cell based on the flight information for at least a period when the UAV transitions the coverage area to reduce interference, wherein the set of network resources comprises one or more Physical Resource Blocks (PRBs), each PRB having a specified frequency band along a frequency dimension and a specified time period over a time dimension and wherein to reserve the set of network resources reserves corresponding PRBs having same specified frequency band and time period for both the first network cell and the second network cell.

* * * * *